United States Patent
Kobashi et al.

(10) Patent No.: US 7,712,026 B2
(45) Date of Patent: May 4, 2010

(54) DOCUMENT PROCESSING APPARATUS, METHOD AND PROGRAM FOR LAYOUT OF DATA CONTENTS ASSIGNED TO REGIONS ON A TEMPLATE

(75) Inventors: Kazufumi Kobashi, Kanagawa-ken (JP); Kenta Hara, Kanagawa-ken (JP); Jun Makino, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 11/045,946

(22) Filed: Jan. 28, 2005

(65) Prior Publication Data
US 2005/0172225 A1  Aug. 4, 2005

(30) Foreign Application Priority Data
Jan. 30, 2004  (JP) .............................. 2004-024585

(51) Int. Cl.
*G06F 3/048* (2006.01)
(52) U.S. Cl. ........................ 715/243; 715/246; 715/272; 715/764
(58) Field of Classification Search ................. 715/517, 715/518, 520, 521, 526, 530, 519, 243, 244, 715/246, 255, 253, 272, 794, 807, 764, 781; 358/1.2, 1.15; 345/637
See application file for complete search history.

(56) References Cited

U.S. PATENT DOCUMENTS

| | | | | |
|---|---|---|---|---|
| 5,018,079 A | * | 5/1991 | Shukunami et al. | 358/1.6 |
| 5,060,170 A | * | 10/1991 | Bourgeois et al. | 715/788 |
| 5,214,755 A | * | 5/1993 | Mason | 715/520 |
| 5,845,303 A | * | 12/1998 | Templeman | 715/517 |
| 5,860,073 A | * | 1/1999 | Ferrel et al. | 715/522 |
| 5,895,476 A | * | 4/1999 | Orr et al. | 715/517 |
| 5,926,825 A | * | 7/1999 | Shirakawa | 715/273 |
| 7,051,276 B1 | * | 5/2006 | Mogilevsky et al. | 715/517 |

(Continued)

FOREIGN PATENT DOCUMENTS

JP   7-129658   5/1995

(Continued)

OTHER PUBLICATIONS

U.S. Appl. No. 10/986,007, filed Nov. 12, 2004.

(Continued)

*Primary Examiner*—Adam L Basehoar
(74) *Attorney, Agent, or Firm*—Fitzpatrick, Cella, Harper & Scinto

(57) ABSTRACT

A layout process using content data as output and a template containing regions to which content data is assigned is provided. A document processing apparatus performing the process includes a priority order setting unit that independently sets, for regions to lay out contents data, priority orders by assigning contents data in the regions and a determining unit for determining the size of a region for which a first priority is set. The determining unit uses a template containing the regions and sizes of contents data to be assigned to regions, and determines a size and a position of remaining regions using a portion of the template to which the regions having higher priorities than the remaining regions not laid out and sizes of the contents data to be assigned to the remaining regions.

9 Claims, 27 Drawing Sheets

U.S. PATENT DOCUMENTS

| | | | |
|---|---|---|---|
| 7,082,576 B2 * | 7/2006 | Shahine et al. | 715/789 |
| 7,129,993 B2 * | 10/2006 | Park | 348/569 |
| 7,346,668 B2 * | 3/2008 | Willis | 709/219 |
| 7,536,657 B2 * | 5/2009 | Shimizu et al. | 715/864 |
| 2004/0070790 A1 | 4/2004 | Hara | 358/1.16 |
| 2004/0255245 A1 * | 12/2004 | Yamada et al. | 715/517 |
| 2004/0268232 A1 * | 12/2004 | Tunning | 715/513 |
| 2005/0198586 A1 * | 9/2005 | Sekiguchi et al. | 715/781 |
| 2006/0150088 A1 * | 7/2006 | Kraft et al. | 715/517 |

FOREIGN PATENT DOCUMENTS

| | | |
|---|---|---|
| JP | 2002297571 | 10/2002 |
| JP | 2004126687 | 4/2004 |

OTHER PUBLICATIONS

U.S. Appl. No. 11/045,776, filed Jan. 28, 2005.
U.S. Appl. No. 11/038,237, filed Jan. 21, 2005.
U.S. Appl. No. 11/045,946, filed Jan. 28, 2005.

* cited by examiner

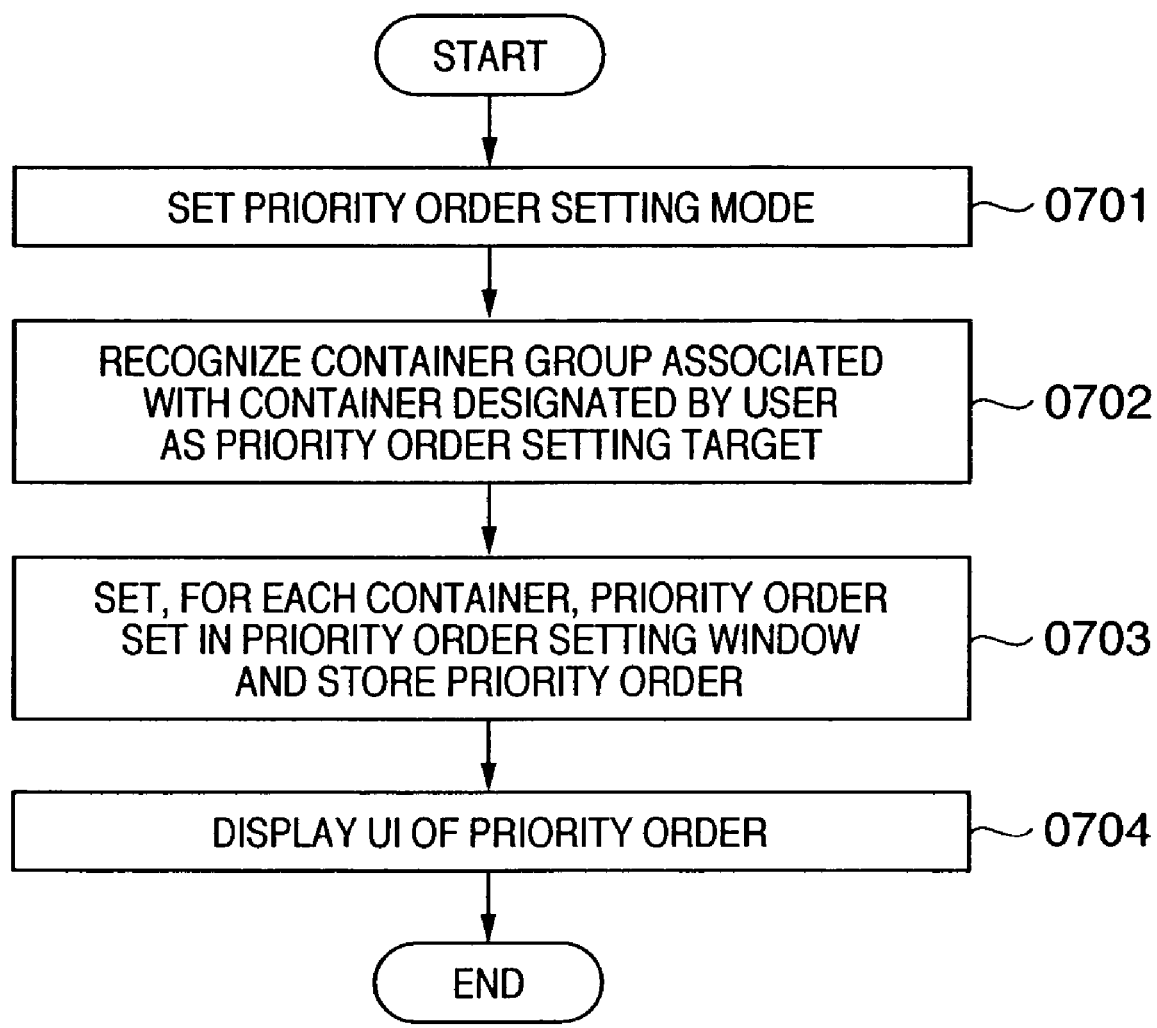

F I G. 13
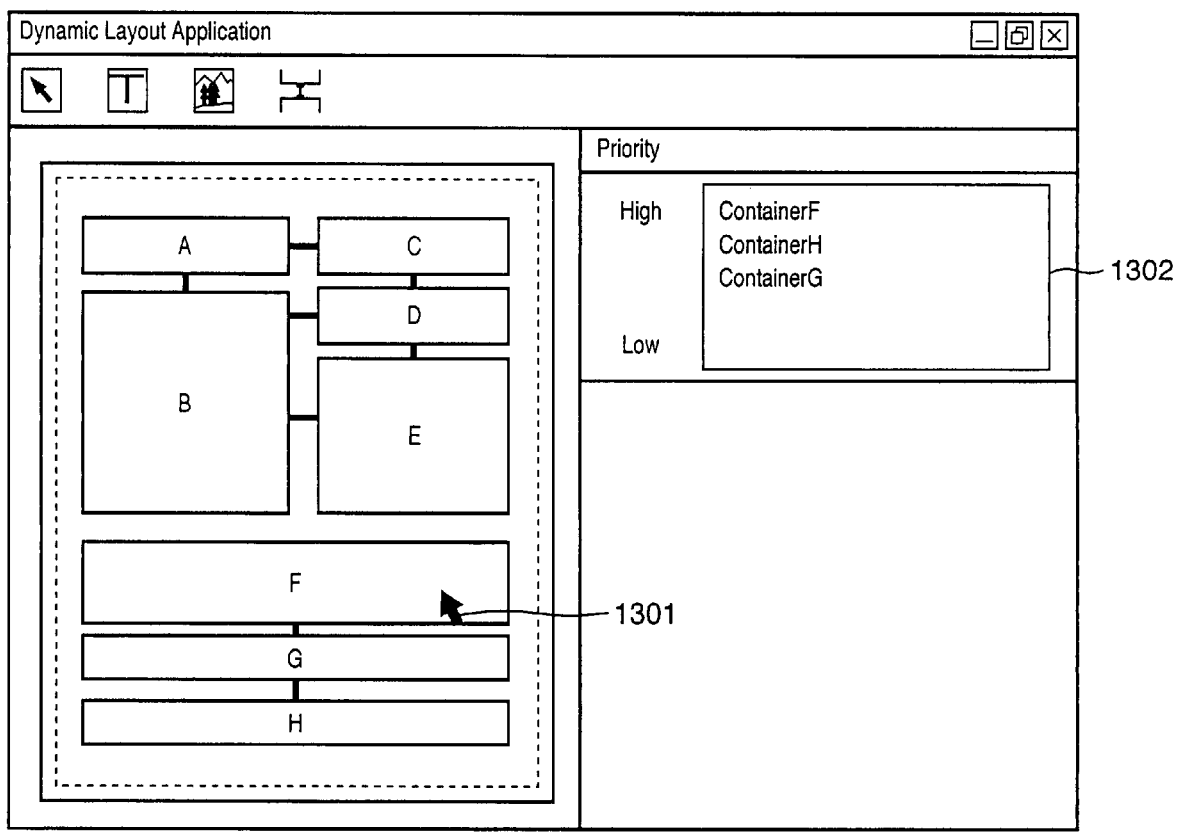

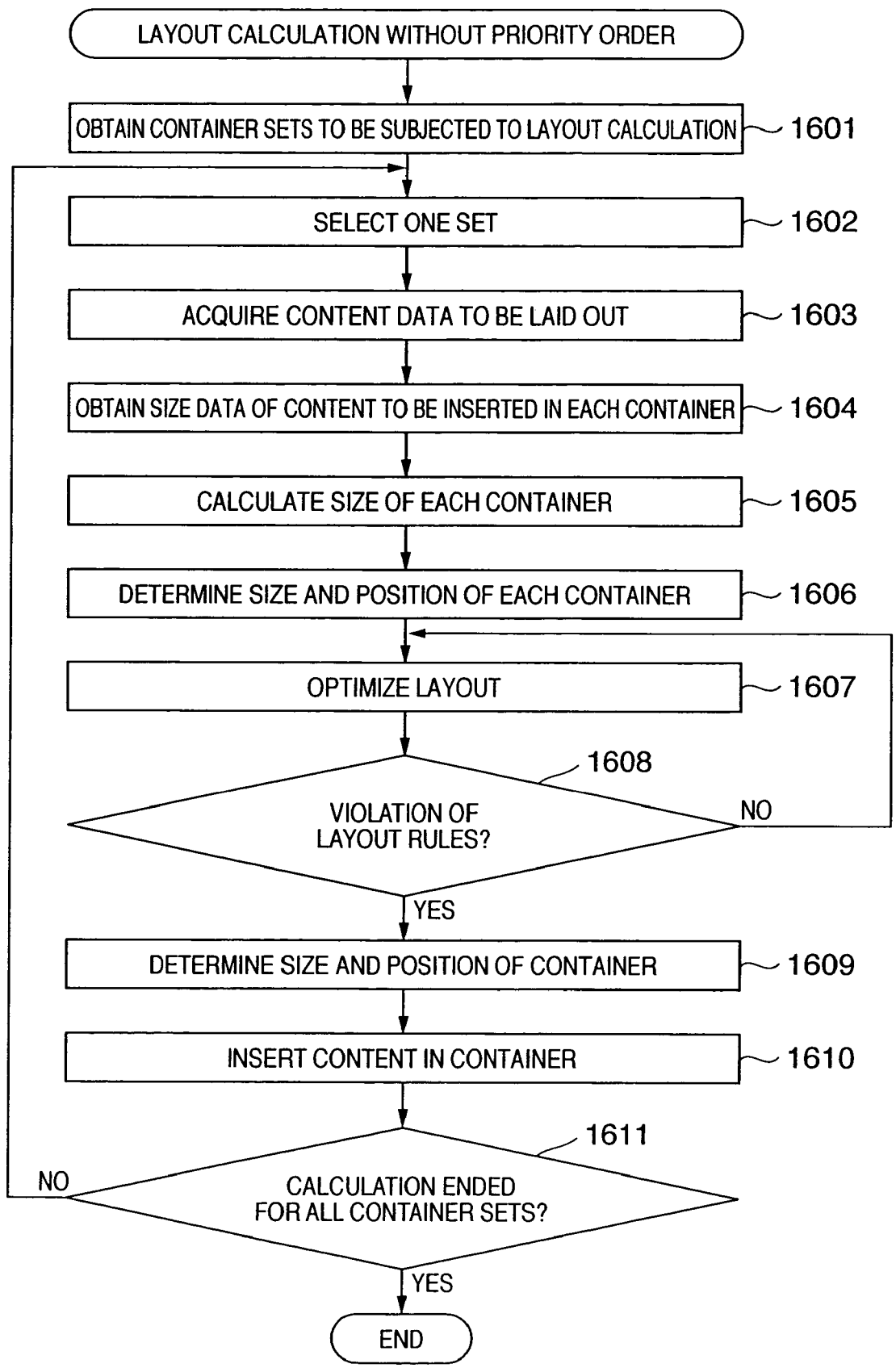

DOCUMENT PROCESSING APPARATUS, METHOD AND PROGRAM FOR LAYOUT OF DATA CONTENTS ASSIGNED TO REGIONS ON A TEMPLATE

CLAIM OF PRIORITY

This application claims priority from Japanese Patent Application No. 2004-024585 filed on Jan. 30, 2004, which is hereby incorporated by reference herein.

FIELD OF THE INVENTION

The present invention relates to a document processing apparatus which has an automatic layout function of laying out the fields of records registered in, e.g., a database at predetermined positions to complete a document.

BACKGROUND OF THE INVENTION

Since the merchandise service life decreases recently due to a variety of merchandise items, and customization service orientation of consumers who use the Internet strengthens, the necessity of CRM (Customer Relationship Management) and one-to-one marketing has received a great deal of attention. These methods aim at increasing the customer satisfaction and winning and networking new customers.

The one-to-one marketing is a kind of database marketing. Personal attribute information such as the age, sex, hobby, taste, and purchase log of each customer is stored as a database. The contents of the information are analyzed, and a proposal that meets customer's needs is presented. A typical method is variable print. Along with the recent progress in DTP (DeskTop Publishing) technology and the spread of digital printers, variable print systems have been developed, which customize and output a document for each customer. Such a system is required to optimally lay out and display contents in information quantity that changes for each customer.

In a conventional variable print system, containers (also called field regions in a document form) are laid out on a document as regions where pieces of information are displayed. A database and the containers are associated with each other to achieve layout display.

However, each container serving as a partial display region in which a text or image is to be pasted has a fixed size. For this reason, when data in the database is inserted in the container, and the data size is larger than the container size, text overlap or image clipping occurs. If the data size is smaller than the container size, a space is formed in the container. In either case, optimum layout display corresponding to the information amount of a text or image to be displayed cannot be implemented.

To solve this problem, automatic layout systems which change the container size in accordance with the information amount have been proposed. An automatic layout system can flexibly set the container size of a text or image. Some automatic layout systems can set a variable container size and increase the container size in accordance with the amount of data to be inserted. In another technique, if text data larger than a fixed container size is inserted, the font size of the text is reduced to display the entire text in the container.

However, when the size of a container is increased, it overlaps another container on the document. When the font size is adjusted in text data with a large amount, the font size becomes too small. Another automatic layout technique to solve these problems is disclosed in the "layout design apparatus" of Japanese Patent Laid-Open No. 07-129658. This document is referred as the patent document 1, hereinafter. In this technique, when the size of a container is increased, the size of another container adjacent to it is reduced.

However, the layout design apparatus described in the patent document 1 manages the priority orders of layout materials. A layout is determined by laying out materials in accordance with the priority order. The apparatus only determines the layout order of unit materials. Since the material with lowest priority is always laid out in a narrow region, the layout desired by the user cannot be obtained. In the automatic layout system described in the patent document 1, the priority order is determined by the type of material. For this reason, when the layout is calculated automatically on the basis of the size of data in the database, the user cannot specifically set how to change the size of each container. For example, assume that two variable containers A and B are present, and data from a database are inserted in them. If both the data inserted in the containers A and B are too large to fit in the page, the mechanism described in patent reference 1 determines the layout on the basis of the priority order set by the type of material. If the priority order is set in order of image, graphic, and text data, the size and position of the container A which receives, e.g., image data are determined first. Then, the size and position of the container B which receives text data are determined.

Even when the user wants to display (print) a specific container created in the document to be created with priority over remaining containers independently of the type of the content to be inserted in the container, the automatic layout system of patent reference 1 determines the predetermined priority order on the basis of the type of content. Even when a content which should have a greater appeal than remaining contents independently of the content type is inserted in a container, the size of the container is determined in consideration of the types of remaining contents. That is, each container cannot preferentially be laid out independently.

It is also impossible to set equal priority orders and determine the layout by increasing the size of each container on the basis of the size of a content inserted in it and changing the sizes of a plurality of containers relative to each other.

SUMMARY OF THE INVENTION

The present invention has been made in consideration of the above-described prior art, and has as its object to provide a document processing apparatus which can increase the degree of freedom of data layout especially by giving priority orders to at least three regions where data are to be laid out on a template.

The present invention which solves the above-described problems has the following arrangement.

A document processing apparatus capable of changing a layout of a document dynamically in accordance with data to be laid out in the document comprises:

priority order setting means for independently setting, for each of a plurality of pieces of region information representing regions to lay out the data, a priority order representing an order of determination of a size of the region by inserting the data in the region;

storage means for storing a template which contains the region information representing the region to lay out the data and priority order information representing the priority order associated with the region by the priority order setting means; and layout means for sequentially laying out the data corresponding to the region in the order represented by the priority order in accordance with the template, and when one of the size and position of the region can be changed, changing one of the size and position of the region in accordance with the data without invading a region associated with a higher priority order than the region.

According to the present invention, a priority order is given to each region where data is laid out on a template, thereby increasing the degree of freedom of data layout. In addition, the layout result predictability can be increased by displaying the priority order for each region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a flowchart showing a flow of priority order setting according to the first embodiment of the present invention;

FIG. 13 is a view showing an example of a UI which presents the priority order to the user in the first embodiment of the present invention;

FIG. 16 is a flowchart showing the flow of layout calculation without priority order according to the present invention;

DETAILED DESCRIPTION OF THE PREFERRED EMBODIMENTS

Preferred embodiments of the present invention will be described. The outline of the present invention will be described first. This embodiment is directed to computer software which causes a computer to implement a so-called variable printing function. This function creates a document by laying out records in a database in accordance with containers (partial regions in which data is to be inserted: also referred to as field regions) defined on a document template (also simply referred to as a template). This embodiment is particularly directed to computer software which causes a computer to implement an automatic layout system having an automatic layout function (or a document processing apparatus having this function) capable of changing the size of a container in accordance with the size of its content. A computer in which this software is loaded as an executable program functions as a document processing apparatus. In this embodiment, especially, the container size of data is changed on the basis of the data size in laying out the data in accordance with the template. In accordance with the priority order given to each container on the template, data is preferentially inserted in a container having a high priority order, and the container size is changed in accordance with the data size. The size of a container having a low priority order is changed without any influence on the container with the high priority order such that a predetermined distance defined by a link between the containers is maintained.

The arrangement and a computer system and that of an application according to an embodiment to which the present invention can be applied will be described next.

<System Arrangement>

Figure 1A:
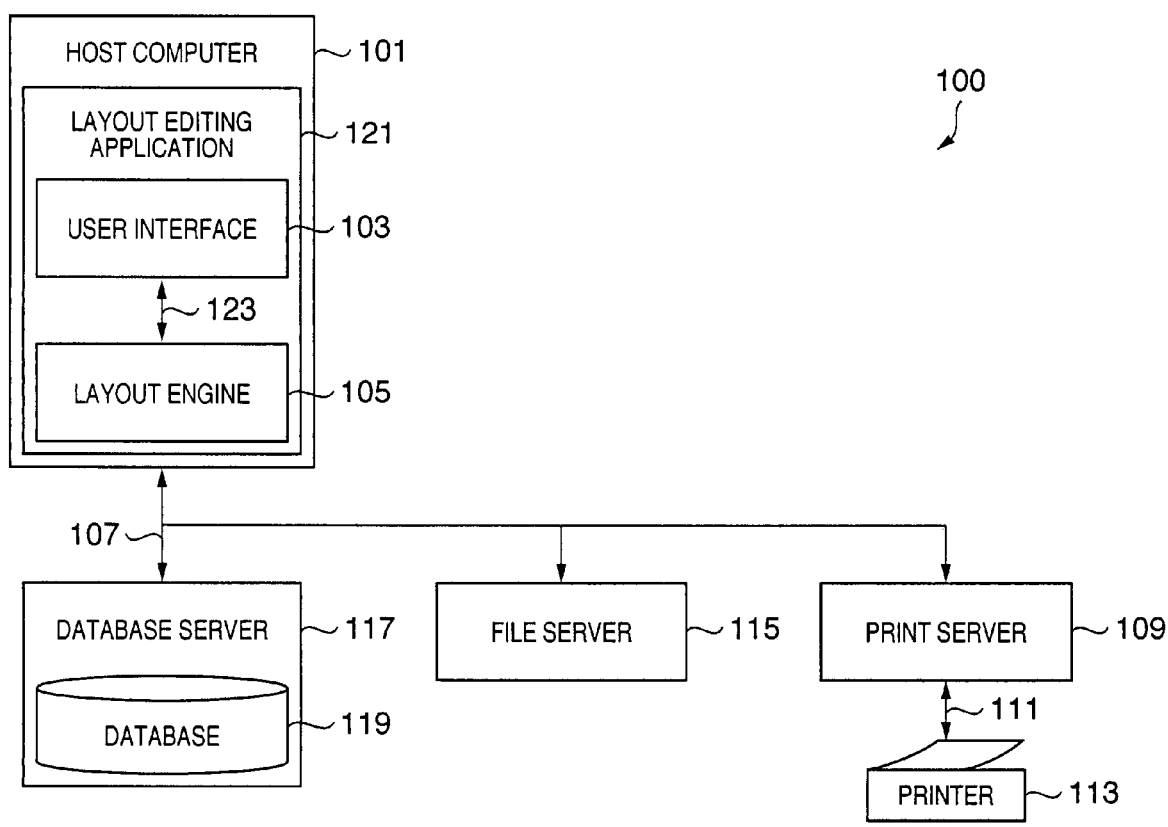
FIG. 1A is a block diagram showing an arrangement of a computer system according to an embodiment.

FIG. 1A shows a system 100 which prints a variable data document. A method to be described in this specification is practiced by causing a general-purpose computer module 101 (to be described in detail with reference to FIG. 1B) to execute a predetermined program. The process to be described with reference to FIG. 1A is executed in the entire or part of software like a layout editing application program 121 which is executed in the computer module 101 and becomes executable on the system 100. Especially, the step of layout editing or printing is executed in accordance with an instruction of software executed by the computer 101 serving as a document processing apparatus of the present invention. The software is stored in a computer-readable medium including, e.g., a storage device to be described below. The software is loaded from the computer-readable medium to the computer and executed by the computer 101. A computer-readable medium which has the software or a computer program recorded on a medium is a computer program product. When the computer program product is used in a computer, the computer functions as an apparatus capable of executing layout editing or variable data print of a document.

The computer module 101 is connected to an input device such as a keyboard 132 or a pointing device like a mouse 133 and an output device including a display device 144 and a local printer 145 depending on the situation. An input/output interface 138 connects the computer module 101 to another computer apparatus in the system 100 through a network connection 107. Typical examples of the network connection 107 are a local area network (LAN) and wide area network (WAN).

The computer module 101 generally includes at least one processor unit 135, a memory unit 136 including, e.g., a semiconductor random access memory (RAM) or read-only memory (ROM), an input/output (I/O) interface including a video interface 137, and an I/O interface 143 for the keyboard 132 and mouse 133.

A storage device 139 generally includes a hard disk drive 140 and flexible disk drive 141. Although not illustrated in FIG. 1B, a magnetic tape drive can also be used. A CD-ROM drive 142 is provided as a nonvolatile data source. The computer module 101 uses the constituent elements (135 to 143) included in the computer module 101, which communicate through an interconnection bus 134, by an operation system such as GNU/LINUX or Microsoft Windows (registered trademark) or by a method by the conventional operation mode of a computer system.

Figure 1B:
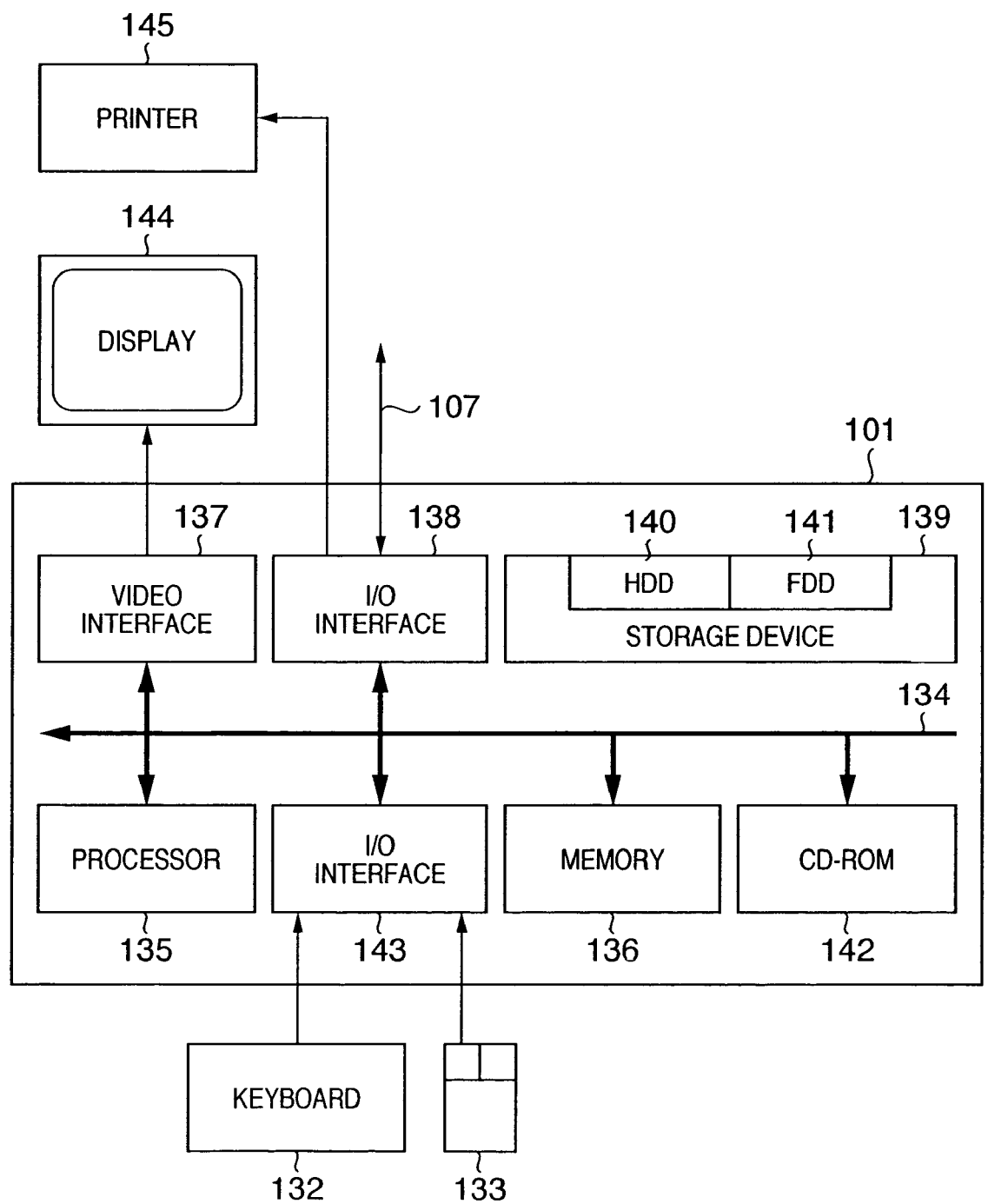
FIG. 1B is a schematic block diagram of a computer module according to the embodiment.

Examples of a computer having the arrangement shown in FIG. 1B are an IBM-compatible PC or Sparcstation available from SUN, or a computer system including them.

The layout application program 121 shown in FIG. 1A is normally resident in the hard disk drive 140 shown in FIG. 1B and loaded, executed, and controlled by the processor 135. In some cases, the application program 121 is encoded on a CD-ROM or flexible disk, loaded through the corresponding flexible disk drive 142 or CD-ROM drive 141, and provided to the user. Alternatively, the application program 121 may be loaded by the user from the network connection 107. The software can also be loaded in the computer module 101 from another computer-readable medium having an appropriate size, including a magnetic tape, ROM, integrated circuit, magnetooptical disk, a computer-readable card such as a PCMCIA card, email communication, and the Internet or an intranet having recording information on a WEB site. These are merely examples of related computer-readable media. Any other computer-readable medium can also be used. Alternatively, the software can be loaded in the computer module 101 from a transmitted signal such as wireless communication or infrared communication between the computer module 101 and another device.

The layout editing application 121 instructs to execute variable data printing (VDP) and includes two software components. The first component is a layout engine 105. This is a software component to calculate the positions of rectangles and lines which form containers on the basis of constraints and sizes given by rectangular containers. When the layout engine 105 operates as an application to determine the size and position of each partial region (container) and outputs drawing information to a printer driver (not shown), the printer driver executes image drawing processing of a variable data document and generates print data.

A user interface 103 as the second component provides a mechanism which causes a user to create a document template and associates the data source with a container in the document template. The user interface 103 and layout engine 105 communicate with each other through a communication channel 123. The data source for document generation is a general database 119 on a database server 117 formed by another computer which is generally making the database application run. The host computer 101 communicates with the database server 117 through the network connection 107. The layout editing application 121 generates a document template to be stored in the host computer 101 or a file server 115 formed by another computer. The layout editing application 121 also generates a document containing a document template merged with data. The document is stored in the local file system of the host computer 101 or in the file server 115, or directly printed by a printer 113. A print server 109 is a computer to provide a network function to a printer which is not connected directly to the network. The print server 109 and printer 113 are connected through a general communication channel 111.

Figure 2:
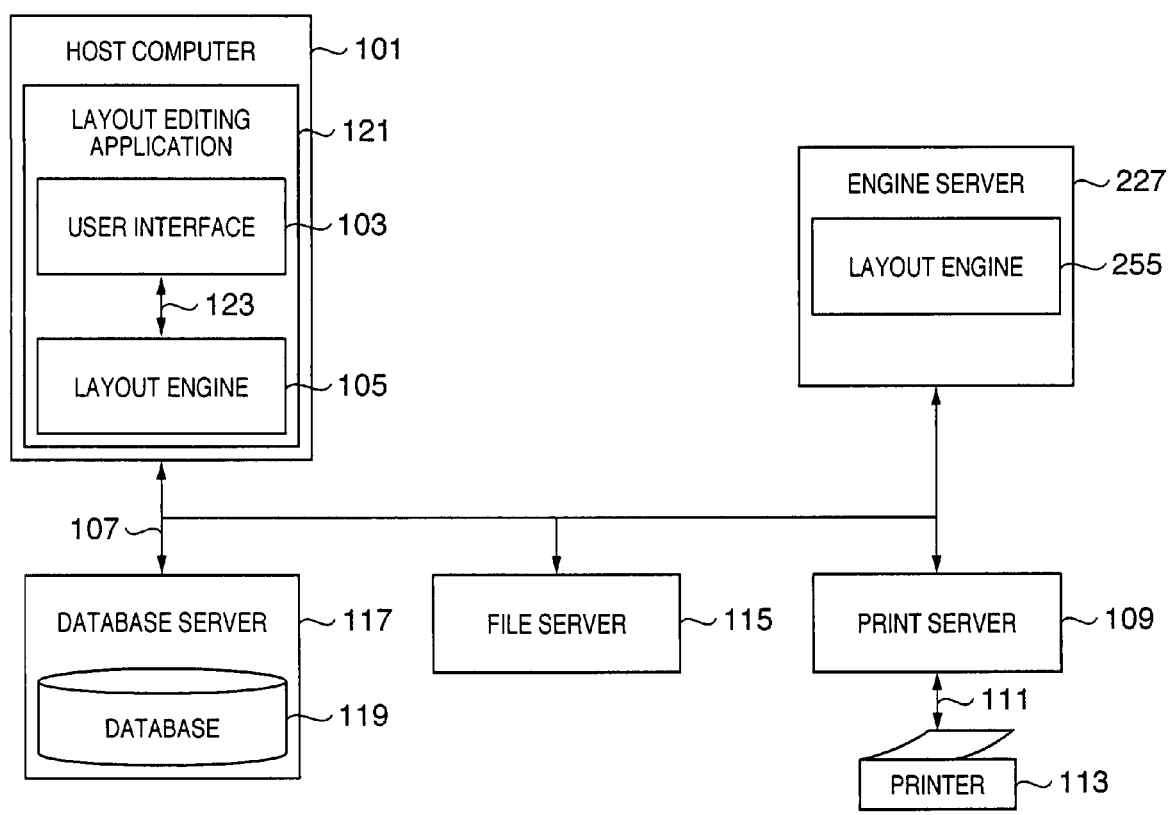
FIG. 2 is a block diagram showing another arrangement of the computer system according to the embodiment.

FIG. 2 shows an arrangement which separates a layout engine 255 from the arrangement shown in FIG. 1A and causes an engine server 227 to execute the layout engine. The engine server 227 is a general computer. A document template stored in the file server 115 can be merged with data stored in the database 119 to cause the layout engine 255 to generate a document for printing or another purpose. This operation is requested through the user interface 103 or requested to print only a specific record.

<Arrangement of Application>

(Main Window)

Figure 3:
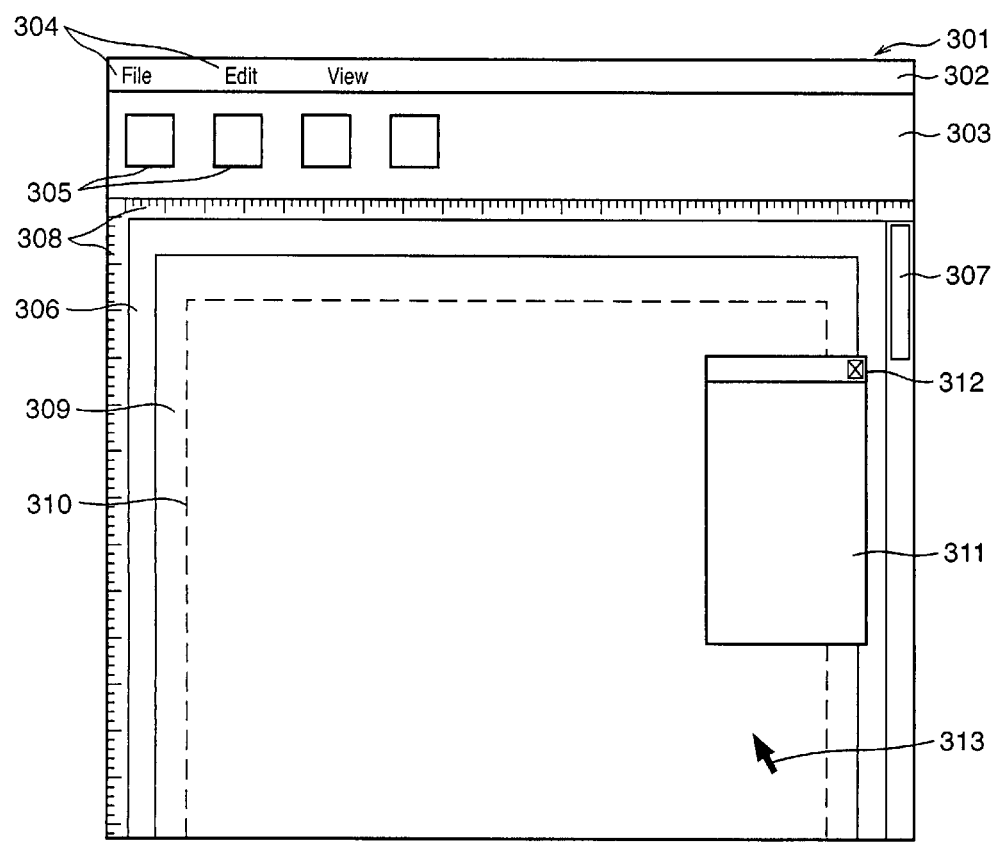
FIG. 3 is a view showing the main window of a typical application including a menu bar, tool bar, work area, and floating palette according to the embodiment.

As shown in FIG. 3, the user interface 103 includes a user interface formed by an application window 301 displayed on the video display 144 at the time of operation. The application window 301 is characterized by a menu bar 302 and tool bar 303 which can be set in a non-display state or moved to various positions on the screen, a work area 306 whose position can be moved by the position and operation of the mouse 133, an optional palette 311, and a cursor/pointer device 313.

The menu bar 302 as a known technique has a number of menu items 304 extended under the layer of menu options.

The tool bar 303 has a number of tool buttons and widgets 305 which can be set in a non-display state or display state by a special mode of the application.

An optional ruler 308 is used to indicate the position of a pointer, page, line, margin guide, layout frame (container), or object in the work area.

The palette 311 is used to access an additional function such as a variable data library. The palette 311 has a window control 312 to move, resize, or close it. The palette 311 can optionally be displayed on the foreground of the work area or hidden behind an object. The palette 311 can be displayed only within the application window 301 or can partially or wholly be displayed outside the application window 301.

Figure 4:
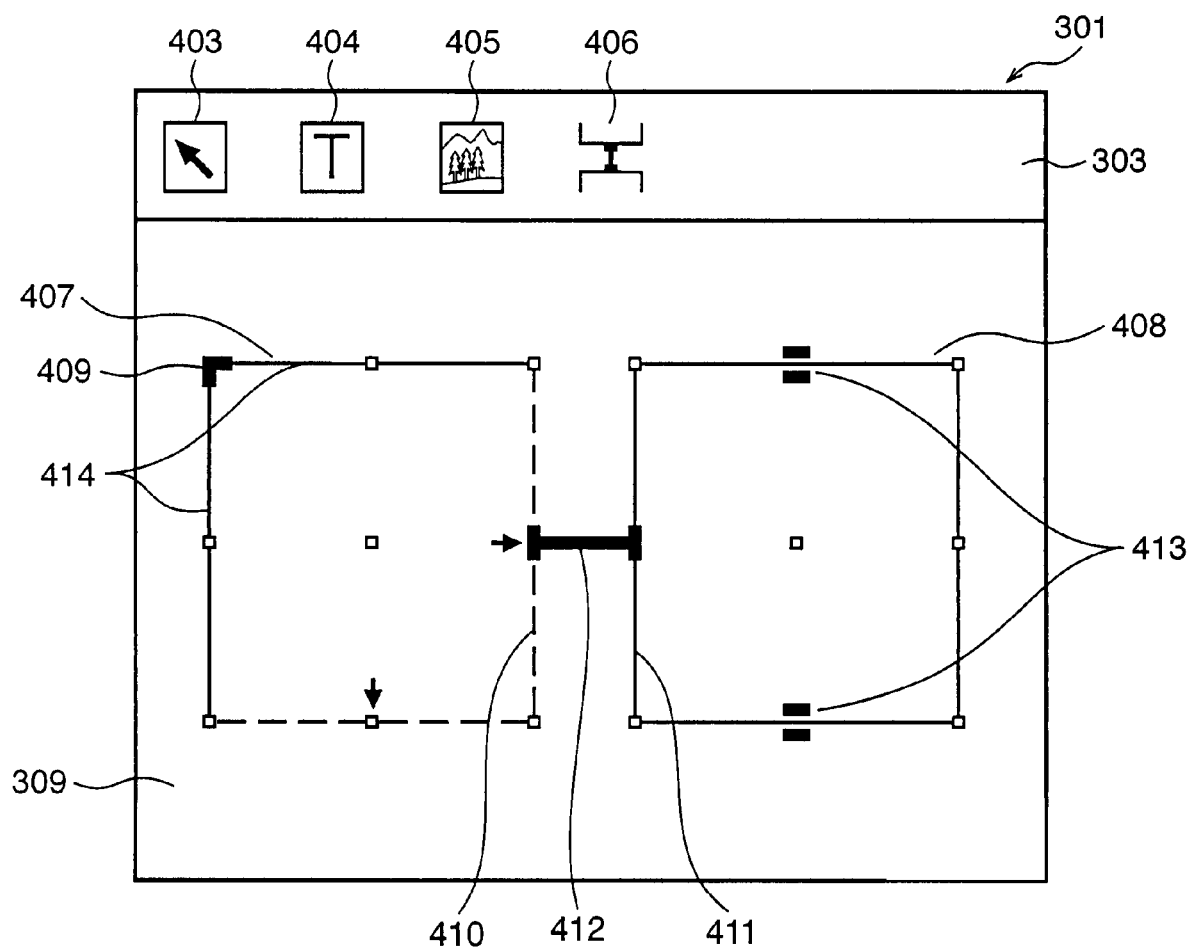
FIG. 4 is a view showing an aspect of typical containers which have a link between them, an anchor, and sliders according to the embodiment by using a screen, tools, and icons.

As show in FIG. 4, the tool bar 303 has at least following user-selectable "buttons".

(1) Select tool button 403: This button is used for side selection, movement, size change, resize, or lock/unlock of a container. A container is selected by dragging a select box around the container. When a plurality of containers are selected while keeping the CTRL key pressed, the plurality of containers can be selected.

(2) Image container tool button 404: This button is used to create a container having a static (fixed) or variable image.

(3) Text container tool button 405: This button is used to create a container having a static (fixed) or variable text.

(4) Link tool button 406: This button is used to control the distance between containers.

These buttons are mounted as tool chips of icons which change in accordance with the operation situation, as is well known.

(Document Template)

The work area 306 is used to display and edit the design of the document template. It allows the user to design the outline of a printed document as preprocessing and understand how the merged document changes on the basis of the amount or size of variable data.

When an external data source (e.g., a record of a database) is linked to the template, a variable text or image is displayed in each container so that a preview of the current document can be obtained.

Objects serving as visual keys to express the document structure and variable data containers are always displayed when the cursor is moved onto a container, or a container is selected.

The work area 306 is characterized by a scroll bar 307, the optional ruler 308, and a document template 309. The document template 309 can indicate the presence of a plurality of pages.

The page size of a given document template is designated by the user by a known technique. The actual number of pages of each document can change depending on variable data. When variable data cannot be fitted in one page, an additional page is automatically created.

A border in each page is a page margin 310 representing the maximum width of an object printable on the page. The page margin 310 can be defined by the user.

FIG. 4 shows examples of objects which can be displayed on the document template 309 of one page. The objects include a plurality of containers 407 and 408, an arbitrarily applicable anchor icon 409, unfixed sides 410, a link 412, and sliders 413.

(Container)

A container is a space having a fixed or variable text or image in the document template. A container is laid out together with other containers and objects. Movement, size adjustment, and re-creation of the container are done by using the pointer 313 by operating the mouse 133, as shown in the user interface window shown in FIG. 3 or 4.

Exactly speaking, a container has an aggregate of settings, visual expression, and interaction and editing operation. The definition of a container will be described below.

(1) A container is associated with a fixed or variable content. A variable content is dynamic in a sense that it is acquired from a data source (e.g., a record of a database) and can change depending on the document. Animated contents or contents which change over time by another method are not included in variable contents because they are not suitable for printing. A fixed content is displayed in the same manner in all documents generated by using one template. However, when a link is set between a fixed content and a variable content, the positions of containers containing fixed contents can change between documents as the positions and sizes of containers containing variable contents change.

(2) A container has ornament functions like text settings such as a background color, border, and font style applied to a content. This setting is called a container attribute. The container attribute can be set for each container. The setting can also be done such that a container has the same container attribute as another container.

(3) A container is merged with data when a document is generated. The ornament function is generally an output product and visible for all fixed contents. A variable content is obtained as specific data from the data source and displayed or printed. A content inserted in a container can be, e.g., printed, displayed on the screen 144, or subjected to both printing and display.

(4) A container has a user interface and, for example, an interactive GUI to edit the container or set display. Each element of the interface is normally displayed on the screen 144. The user interface 103 displays some of the ornament functions of a container such as the background color and font. The user interface 103 also has a function of editing or displaying container setting. Examples of purposes of the user interface function are a border, a corner icon to interactively change or display the size and position of the container, and the number of times of overwrite, line, icon, and text when the container is merged with data from the data source.

(Constraints of Container)

A container has constraints to control the manner a content to be displayed or printed in each document is fitted in the container. These constraints are used as a principal means for causing the user to control a number of documents by one document template. An example of the constraint is "the maximum height of the content of this container is 4 inches". Another example of the constraint is "the left edge of the content of the container must be displayed at the same horizontal position in each document". Various methods for displaying and editing the constraints by using a GUI will be described hereinafter.

A content place holder which designates the layout of a fixed content such that, e.g., an image has a defined position on a page is well-known in the digital print technique. In the following description, a container has a position and size which can be edited and displayed by a known technique.

The user can designate the sizes and positions of the contents of a document by designating the positions, sizes, and constraints of containers. Since a plurality of document are generated from one document template, the user interface needs to be used to designate and display a number of possible settings and constraints of containers.

The sides of one container define the virtual border of a content associated with the container displayed in the document. More specifically, the left side of a container corresponds to the left edge of layout of the content associated with the container in all documents to which the same template is applied. Similarly, the height of a container can be understood as a constraint of the height of a content associated with the container in a document generated by applying the same template. In this specification, this discrimination will be clarified in a description of the side or size of a container by referring to the user interface 103.

Detailed examples of container constraints in this embodiment will be described below. The term "fixed" is used in a sense that a certain value is commonly used in all documents in which a certain container is commonly used.

(1) When the width of a container is fixed, the width to be assigned to a content associated with the container has the same value (fixed value) for the page containing that container in all documents generated by using the template containing the container.

(2) When the height of a container is fixed, the height to be assigned to a content associated with the container has the same value (fixed value) for the page containing that container in all documents generated by using the template containing the container.

(3) When the distance constraint is fixed, the designated distance (fixed value) is a constraint for all documents generated by using the template containing the container.

(4) When the left and right sides of a container are fixed, the horizontal position of the sides of the container is the same for the page containing that container in all documents generated by using the template containing the container. However, the height or vertical position of the container can change. For example, if the left side of a container is fixed, the content associated with the container may be displayed near the upper edge of a page in a document generated by using a template or near the lower edge of a page in another document. However, the horizontal position of the left side is the same in all documents.

(5) When the upper and lower sides of a container are fixed, the vertical position of the sides is the same for the page containing that container in all documents generated by using the template containing the container. However, the width or horizontal position of the container can change.

(6) The vertical axis of a container is a virtual vertical line which is parallel to the right and left sides of the container and is located at the intermediate position therebetween. When the vertical axis of the container is fixed, the average of the horizontal positions of the left and right sides of the container is the same for the page containing that container in all documents generated by using the template containing the container. In this constraint, the width of the container can change. For example, the horizontal position of the left and right sides of a container can be close to or far from the vertical axis in different documents. However, the vertical axis is located at the same horizontal position for the page containing that container in all documents generated by using the template containing the container. The height and horizontal position of the container are not affected by this constraint.

(7) The horizontal axis of a container is a virtual horizontal line which is parallel to the upper and lower sides of the container and is located at the intermediate position therebetween. Like the vertical axis, when the horizontal axis of the container is fixed, it restricts the vertical position of the upper and lower sides of the container. However, the height is not affected by this constraint.

(8) When both the horizontal and vertical axes are fixed, the central position (intersection between the vertical and horizontal axes) of the container is fixed. However, the width and height of the container are not affected by this constraint.

(9) When a corner of a container, the intermediate position of a side of a container, or the central position of a container is fixed, the content associated with the container is displayed at the same position for the page containing that container in all documents generated by using the template containing the container. For example, when the upper left corner of a container is fixed, the upper left position of the container laid out is the same for the page containing that container in all documents generated by using the template containing the container.

(10) The vertical sides or vertical axis is fixed in association with the left or right side of the page, left or right page margin, or another horizontal position. Similarly, the horizontal sides or horizontal axis is fixed in association with the upper or lower side of the page, upper or lower page margin, or another vertical position.

A term opposite to "fixed" is "variable" which indicates that a side, axis, corner, intermediate position, or a document constraint can change between documents. However, it may be unnecessary due to specific setting of a document. For example, there is another external constraint such as an actual preferable position of a side by change. However, when no external constraint is applied, the position of the side can be changed because it is labeled as unfixed.

<Layout Mode (Display and Editing of Container)>

The procedures for creating a document to be variable-printed can be divided into two phases, i.e., template creation processing (layout mode) for creating a template and a document creation processing (processing for displaying a preview of a document will particularly be called a preview mode) for creating a document by inserting contents in the created template. The layout mode will be described.

(Method of Creating New Container)

Containers are classified into two types: text container and image container. A text container has a text and an embedded image. An image container has only an image.

As shown in FIG. 4, a new text container or image container is created on the document template 309 by clicking on the text container tool 404 or image container tool 405 by the mouse 133 and dragging a rectangle onto the template 309.

Alternatively, a container can easily be created by activating the appropriate tool 404 or 405 and clicking the mouse on the document template 309. When a new container is created, a container having a default size is inserted. Alternatively, a dialogue box or prompt is displayed to input the size of the new container. A container can also automatically be created and laid out by a schema defined or calculated in advance.

(Container Display Method)

The states of the sides of a container created in the document template are preferably graphically displayed on the user interface, as shown in FIG. 4. When the states of the sides are indicated by common expression, the number of types of objects corresponding to states can further be reduced.

FIGS. 5A to 5D are views showing display examples of a container. To express the state of a side, the layout editing application 121 expresses a side by a solid line 503 or dotted line 504. A container has anchors (line, shape, and icon indicated by objects 506, 507, and 509 drawn near the sides), handles (control points drawn on or near the sides or shapes for movement and correction) 502, sliders (short parallel lines drawn on both sides of a side, 403 in FIG. 4), enlarge/reduce (arrow) icons 505, and colors as characteristic features.

The rules of the container display method shown in FIGS. 5A to 5D are as follows.

(1) When each side is fixed, the side is drawn by a solid line.

(2) When the width is fixed, the left and right sides are drawn by the solid lines 503.

(3) When the height is fixed, the upper and lower sides are drawn by the solid lines 503.

(4) The axes are not drawn.

(5) The enlarge/reduce icons 505 are drawn near a side which is not drawn yet, and the side is drawn by a dotted line 504.

(6) At the intersection between a vertical side or axis and a horizontal side or axis, an anchor is drawn if both of the sides or axes crossing each other are fixed.

(7) When no anchor is drawn anywhere on a fixed side, a slider is drawn at the center of the side.

(8) At the intersection between a vertical side or axis and a horizontal side or axis, a handle is drawn if neither anchor nor slider is drawn there.

Flexible sides are drawn by dotted lines. Anchors are displayed at fixed points defined by the rules 6, 7, and 8. Sliders are displayed on fixed sides. Handles are displayed on remaining sides.

In the above description, a side must be drawn only once. If a rule influences the side to be drawn, subsequent rules do not influence the side to be drawn. In addition, if a container is very small, and icons overlap or make another display function unclear, the icons may be omitted.

The location where a variable side (i.e., a movable side) is drawn depends on the content of the container. As will be described later, "dynamic correction processing" is performed in which a content is merged with a document template, and a document is displayed on the user interface.

These content expressions provide a graphical means for displaying the state of a side of a container. The expressions can be interpreted in the following manner.

(1) A dotted line indicates the position of a side in the document corresponding to the content of the container, like the side 410 shown in FIG. 4.

(2) A solid line indicates a restricted side. This is because a side indicated by a solid line is fixed (side 414), or the width or height of the container is fixed (both the width and height are fixed in the container 408).

(3) An anchor indicates that the intersection between sides or axes is fixed. For this reason, an anchor point appears at the same horizontal and vertical positions in all documents to which a document template containing the anchor point is applied. The anchor is fixed, as a matter of course. The icon 409 in FIG. 4 is an example of an anchor icon which aims at fixing the sides 414 crossing each other.

(4) A slider indicates that the associated side is fixed in the vertical direction of the side. However, the container can be moved to a position slid along the side by the "length of the slide". For example, the content of the container 408 may be moved to the left or right in the document and displayed by operating the sliders 413.

Some or all of these icons and sides are drawn or not depending on which tool or container is selected, highlighted, or activated. Generally, the sides of a container and icons are displayed to design the document template and not drawn on a printed product to which the created document template is applied.

Settings of the minimum and maximum values of the width and height of a container are displayed in a secondary dialogue window.

Figure 5A:
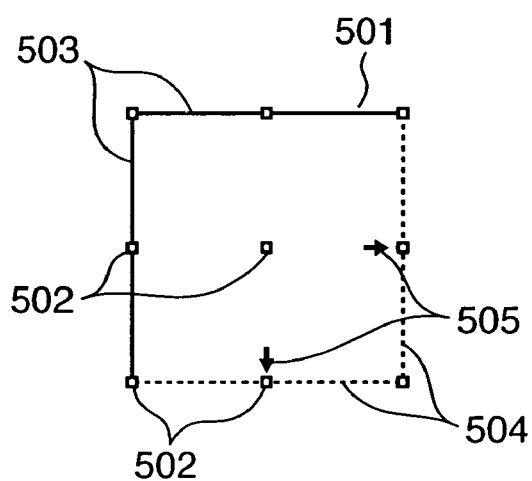
FIGS. 5A to 5D are views showing typical container rules according to the embodiment.

Referring to FIG. 5A, neither the width nor height of the container 501 is fixed. The fixed sides 503 are expressed by solid lines. The variable sides 504 are expressed by dotted lines. A dotted line indicates that the side can be changed in accordance with the size of a content of the container. On the other hand, the enlarge/reduce icons 505 are indicators representing that the adjacent sides 504 can be changed as another container associated by a link changes its size or moves.

Figure 5B:
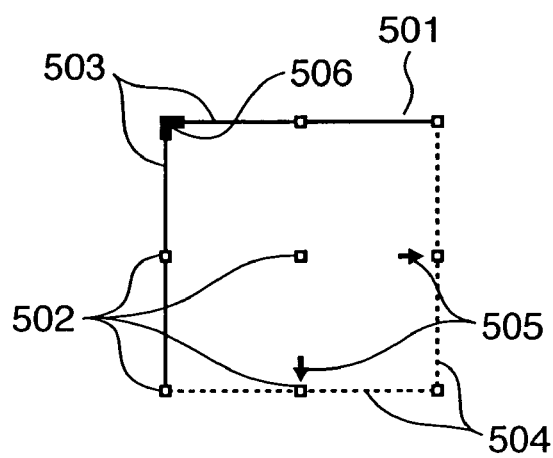

Referring to FIG. 5B, both the width and height of the container 501 are variable. The anchor icon 506 indicates that the two crossing sides 503 are fixed.

Figure 5C:
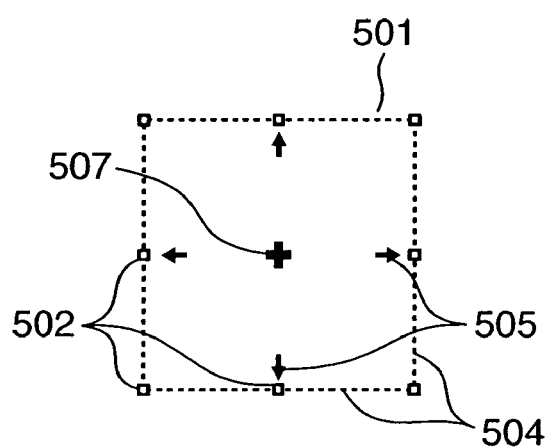

Referring to FIG. 5C, the container 501 can extend equally from the point indicated by the anchor icon 507. The container 501 can change both the width and height. In enlargement/reduction, the layout is adjusted such that the anchor icon 507 is always located at the central point of the container 501.

Figure 5D:
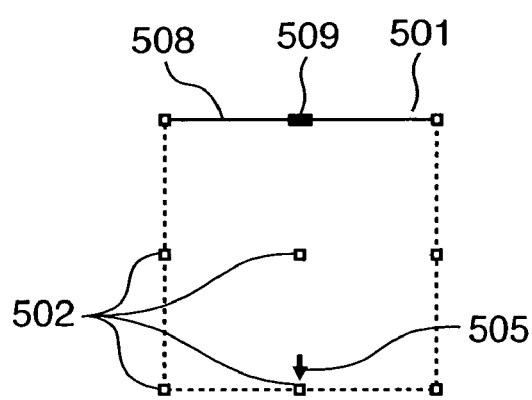

Referring to FIG. 5D, both the width and height of the container 501 are variable except that an upper side 508 is fixed. The anchor icon 509 displayed at the center of the upper side 508 indicates that the left and right sides of the container can move about the central axis (vertical axis) which passes through the icon 509 and is drawn vertically.

<Example of Data of Document Template>

Figure 26:
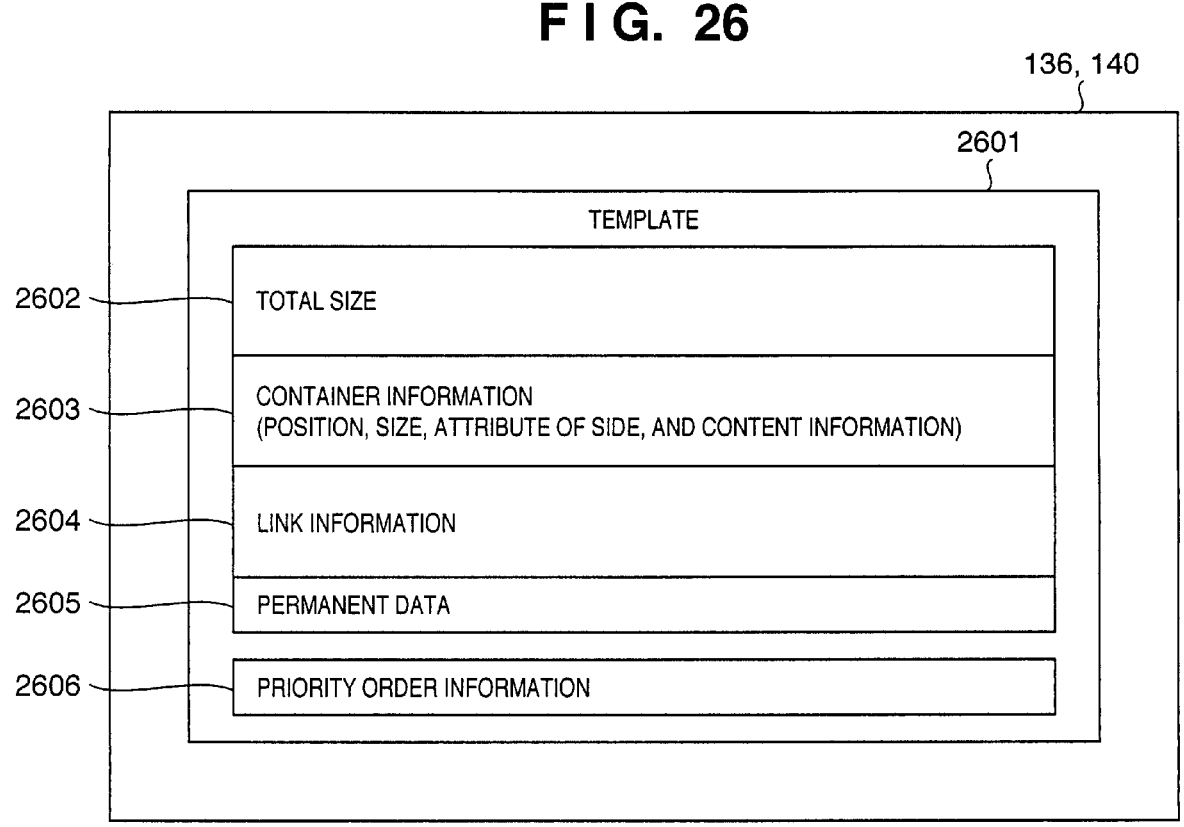
FIG. 26 is a view showing an example of the structure of template data.

FIG. 26 shows an example of data of a document template (to be referred to as template data). Referring to FIG. 26, template data 2601 is stored in the memory unit 136 or hard disk 140. The template data contains the following elements.

(1) Total size 2602: The page size of the whole template. The size is represented by, e.g., the vertical and lateral lengths, or a standard paper size.

(2) Container information 2603: Identification information to specify each container laid out on the template, the reference position of each container (position information), the length of a side (size information), the attribute of a side or point of a container (attribute information), and information of a content associated with a container.

Position information and size information are defined when a template is created. Position information indicates the reference position of a container set by the user when the container is created. When the position of the container is variable, the container size is changed in accordance with the size (image size or text size) of the content inserted in the container, and the container position is changed dynamically in accordance with the size of each container. When the position of the container is fixed by an anchor or the like, the position information indicates the fixed position. The position information contains information capable of specifying at least the positions of diagonal points of the container. All points may have position information on the template. Alternatively, one point may have position information on the template, and the remaining points may have relative position information. That is, the position can be defined by one point of the container and the size of the container. Fixed points may be defined by positions on the template, and variable points may be defined by relative positions.

Attribute information indicates the attribute of a side or axis of a container or the intersections between them, which have been described with reference to FIGS. 4 and 5A to 5D. The upper, lower, left, and right sides, horizontal and vertical axes, corner points, central point, width, and height of a container are defined by, e.g., the position and size. Whether each element is variable or fixed is defined by attribute information. When a document template is created by the user interface shown in FIG. 4, a side, point, or axis of a container is selected. In this state, the operator selects a desired item from menus "fixed" and "variable" displayed in the palette 311. Accordingly, the attribute "fixed" or "variable" is written in the container information 2603 in correspondence with the selected point or side. Default values immediately after container creation are, e.g., "variable". In this example, when a side or axis is "fixed", not the length of the side or axis or its position in the longitudinal direction but the position in a direction perpendicular to the longitudinal direction is fixed. When the attribute of a point or side is set, and accordingly, the attributes of the remaining points or sides are defined automatically, the attributes are also written. For example, when a corner point is designed as "fixed", the sides that define the point are also "fixed", and vice versa. In addition, for example, when the position of the central point is designated as "fixed", "fixed" is written in the attribute of the central point. Simultaneously, the attributes of horizontal and vertical axes are also written as "fixed". In this case, if the width and height remain variable, the attributes of the width and height are maintained "variable".

Information (content association information) about an associated content contains, e.g., information representing the container type (text container or image container), the identifier of a data source to be inserted in the container (e.g., some or all of the database name, record name, and field name), and association information (e.g., a conditional expression to extract the content). For a text container, text enhancement information such as information about the font, including the font type, size, color, italic, bold, and underline is also contained in the content association information.

Pieces of container information 2603 are held equal in number to containers arranged on the document template.

(3) Link information 2604: A link is association between containers and is especially information to set the distance between two containers combined by a link to a predetermined value (fixed link) or in a variable range (variable link). The link information contains, in each of the horizontal and vertical directions, the identifiers of two containers, information representing that a link is set between the opposing sides of the containers, and the distance between them in the direction along the link. Link information is held for each defined link. As the form of link information, the position of a side of each container may be held in each of the horizontal and vertical directions, and information representing that a link is set between the sides may be held.

(4) Permanent information 2605: Permanent information contains information to define a fixed portion except variable portions. For example, a text or image common to all documents (all records) generated by using the template can be defined. For a text or image, only position information can be defined instead of containing the data itself. Information to define the layout position on the template data is also contained, as a matter of course.

(5) Priority order information 2606: Priority order information indicates the priority order of a container associated by a link contained in the template. When the records of the database are put into a document in accordance with the template, the size of a container having a higher priority order is preferentially changed in accordance with the content. That is, the size of a container having a higher priority order is calculated with priority over a container having a lower priority order such that the container can have a size corresponding to the content size. On the other hand, the position and size of a container having a lower priority order are calculated subordinately after the size of the container having the higher priority order is determined. In this embodiment, the priority order information 2606 is indicated by a combination of, e.g., the identifier of a container (element container) as an element of a container set formed by a link and a value representing a priority order corresponding to the container identifier. The priority order can also be indicated even by an arrangement in which the identifiers of containers are arranged in accordance with the priority order. In this case, the order of identifiers forms the priority order information.

<Link Setting Method>

Figure 6A:
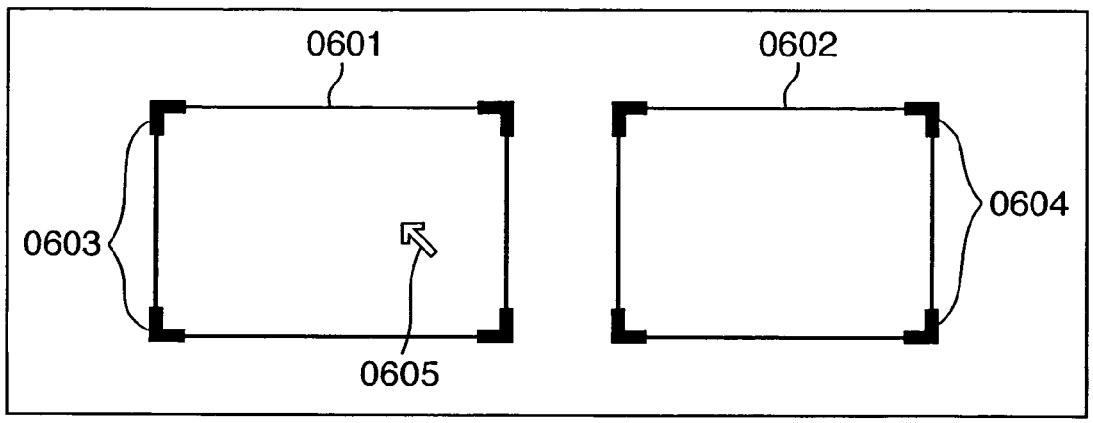
FIGS. 6A to 6C are views showing examples of a UI in creating a link.
Figure 6B:
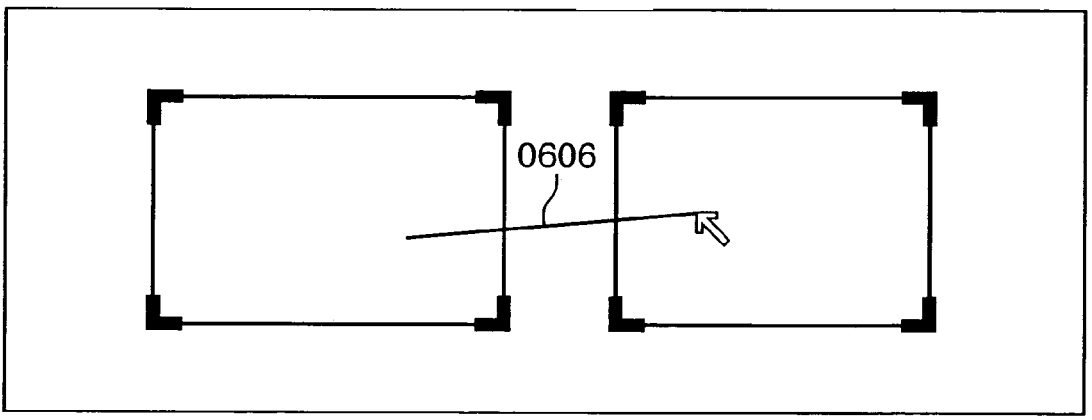
Figure 6C:
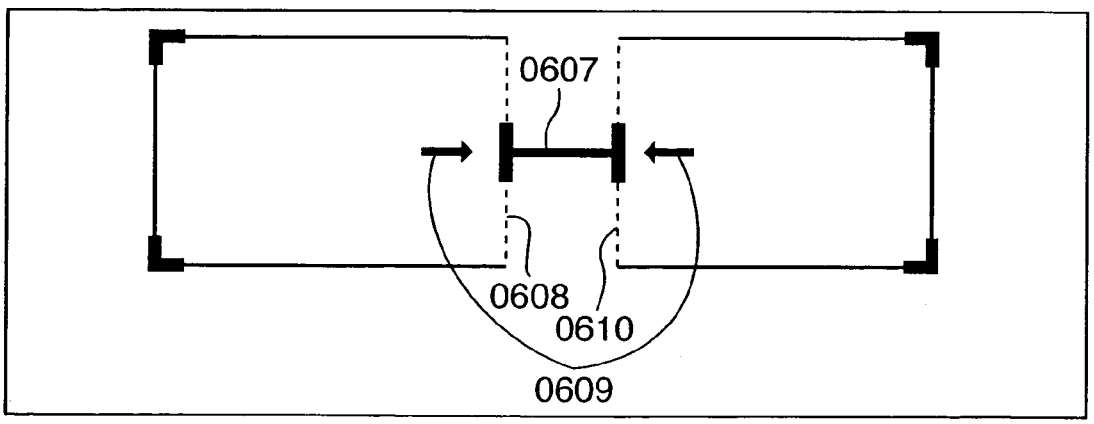
Figure 8:
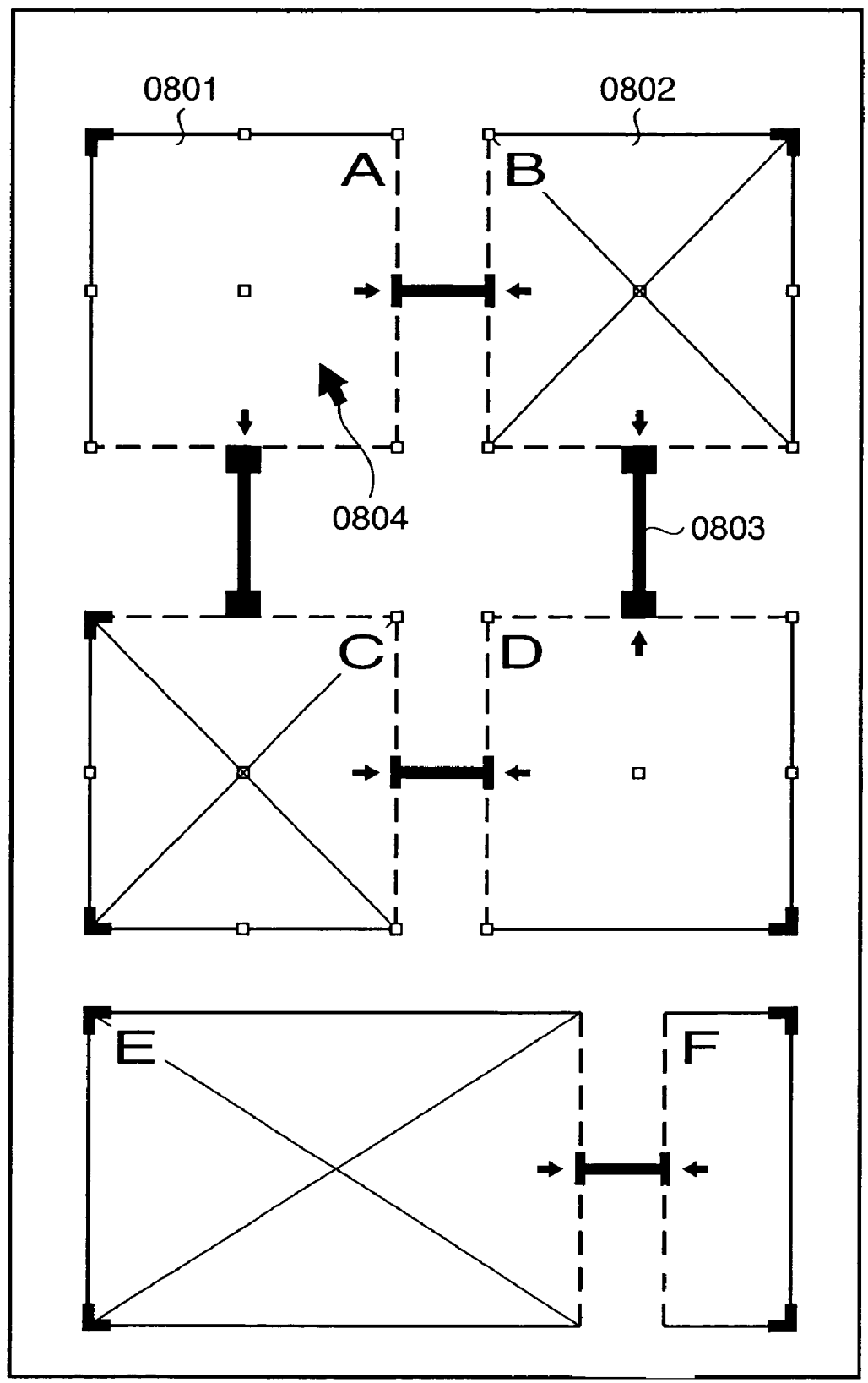
FIG. 8 is a view showing a container set in priority order setting of the present invention.
Figure 25:
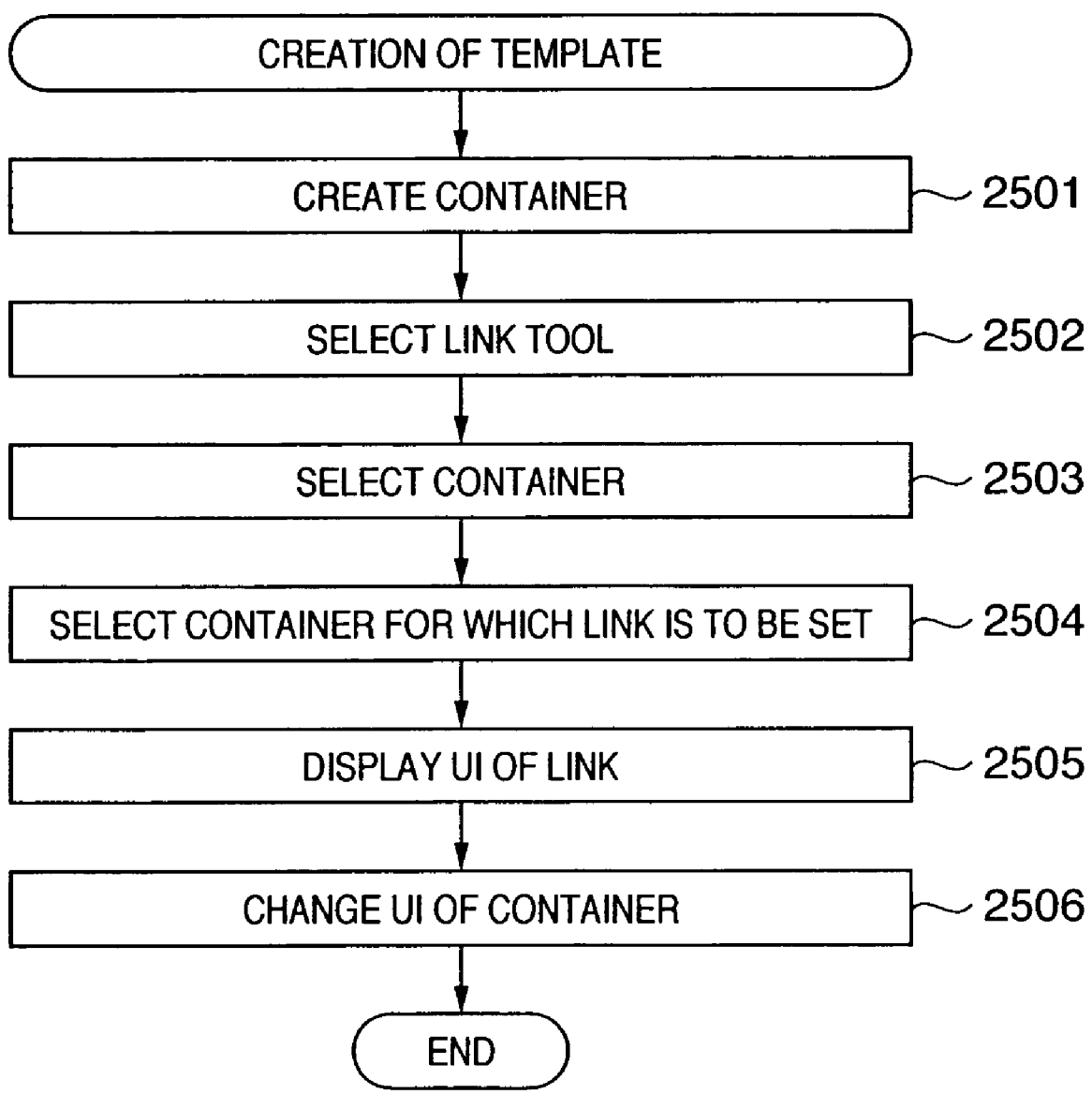
FIG. 25 is a flowchart showing a flow of link creation according to the present invention.

FIG. 25 is a flowchart showing a link setting method by the layout editing application 121. FIGS. 6A to 6C show examples of a UI. A method of setting a link between containers will be described below with reference to FIGS. 6A to 6C and 25.

First, to set a link, the layout editing application 121 creates containers (at least two containers) to set a link in accordance with an operation instruction from the user (step 2501). Next, the link tool button 406 shown in FIG. 4 is selected (step 2502). FIGS. 6A to 6C show examples of the user interface when two containers are created, the link tool is selected, and the operation of setting a link is executed. FIGS. 6A to 6C will be described sequentially.

Sides 0601 and 0602 shown in FIG. 6A are fixed sides which are the same as the sides 407 and 409 in FIG. 4 described above. Anchors 0603 and 0604 are the same as the anchor 409. First, the user selects one container as a link setting target by clicking on it (step 2503). As shown in FIG. 6B, the mouse pointer is moved to the other container, and the mouse is clicked on it (step 2504). A line 0606 shown in FIG. 6B indicates a line which connects the first click point in FIG. 6A and the position of the mouse pointer after movement. The line 0606 is a UI which presents the link setting position to the user. After step 2504, the containers are set in the state shown in FIG. 6C. A link 0607 is displayed at the set position (step 2505). When the link is set, the objects which indicate the containers are also changed automatically (step 2506). Sides 0608 and 0610 indicated by dotted lines are variable sides. The sides of the containers are changed as shown in FIG. 6C because they need to be changed to variable sides in accordance with link setting. If all sides are fixed even after link setting, a contradiction occurs. The above-described processing is executed automatically to prevent this contradiction. Enlarge/reduce icons (arrows) 0609 are the same as the icons 505 in FIGS. 5A to 5D. The enlarge/reduce icons 0609 are objects which visually present, to the user, directions in which the containers can change due to link setting. In the example shown in FIG. 6C, the right side 0608 of the left container and the left side 0610 of the right container change to variable sides. This is merely an example. The right container may have the slider 413 in FIG. 4.

This processing can be described as follows from the viewpoint of data processing in FIG. 25. For example, in step 2501, container information 3303 is defined by creating containers. In step 2506, the layout editing application 121 stores, as link information, that a link is set between the two containers selected in steps 2503 and 2504. In step 2506, the layout editing application 121 changes the attributes of the opposing sides of the two containers having the link as needed. For example, if at least one of the opposing sides is variable, the attributes of the sides need not be changed. However, if both sides are fixed, link setting is meaningless. Hence, at least one of the sides is changed to a variable side. In the example shown in FIGS. 6A to 6C, both sides are changed to variable sides. When the attributes of the sides are changed, the attribute information of each side having the changed attribute contained in the container information 2603 is rewritten.

In the above description, expression "opposing" has been used. This applies to a case in which two lines apparently oppose each other. Additionally, when lines themselves do not oppose (i.e., when the projections of two lines in the longitudinal direction do not overlap) but the extended lines of the lines oppose each other, a link can be set between the extended lines. In this specification, the expression "opposing" is used for containers associated by a link, including those having sides whose extended lines oppose each other. That is, a link can be set even between small containers laid out along, e.g., a diagonal line of the template.

As described above, when one of the opposing sides of containers associated by a link is variable, and the other is fixed, the variable side can move in accordance with the content size. The container itself on the side of the fixed side translates in accordance with the movement amount of the variable side (if no anchor is present). The distance (distance in the direction along the link) between the containers, which is defined by the link, is maintained. When both sides are variable, the sizes of both containers can change in accordance with content sizes. Even in this case, the distance between the containers is maintained.

<Priority Order Setting Method>

FIG. 7 shows a priority order setting method by the operator. The procedures shown in FIG. 7 are executed by the computer shown in FIGS. 1A to 2 in accordance with the operation by the operator. The procedures are started from a state in which a template defined in advance is displayed. A template is created by defining, for each template, the attribute information of the template including a template name, containers defined in it, and container attribute, and the information shown in FIG. 25 such as link information and permanent information.

Each step will be described below with reference to FIGS. 8 to 11 which show the UI.

Figure 11:
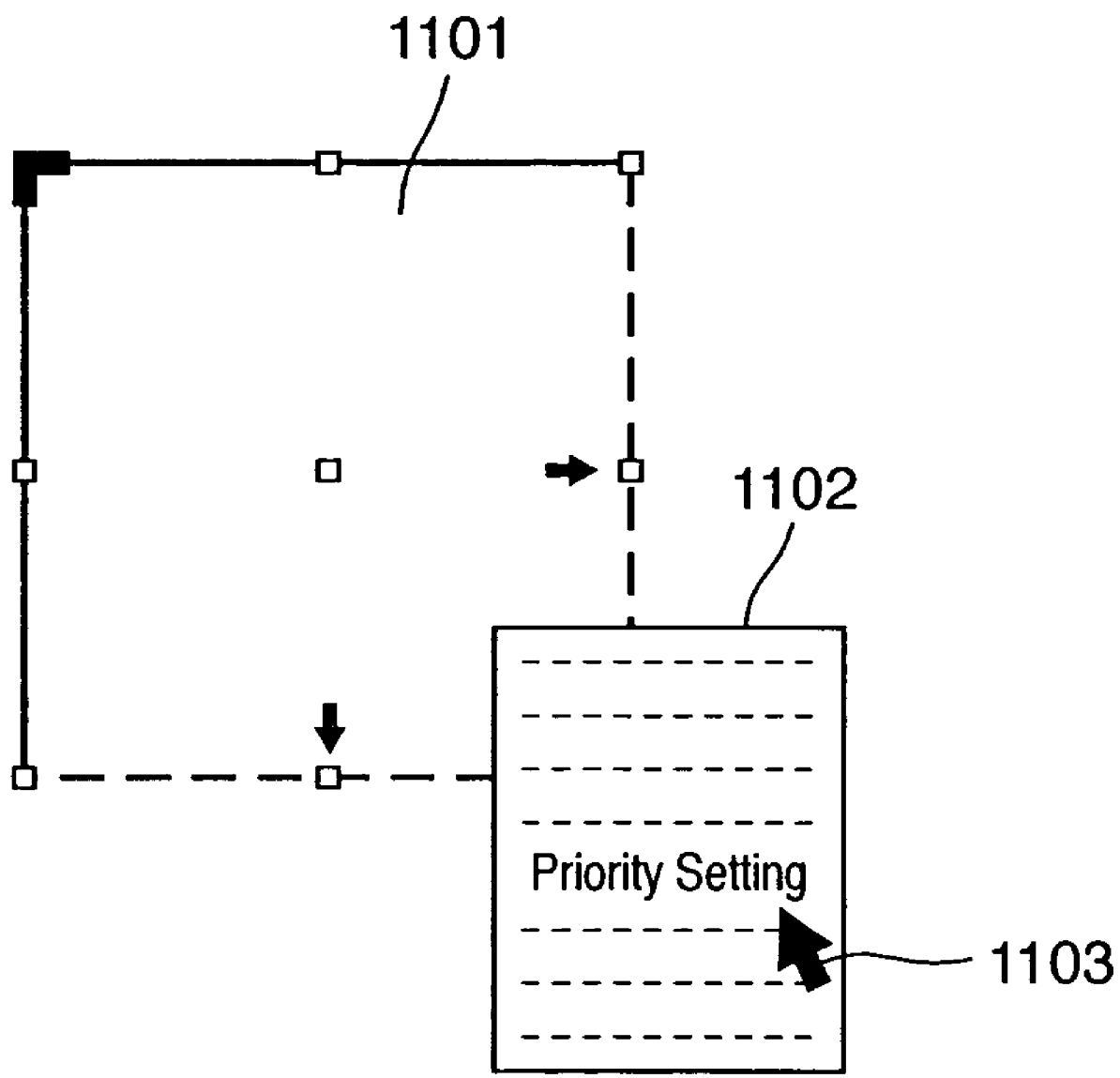
FIG. 11 is a view showing an example of a pop-up menu to set a priority order setting mode according to the first embodiment of the present invention.

First, as shown in FIG. 11, the user selects a container as a priority order setting target from the template display window in the template mode. When the pop-up menu is displayed, and priority order setting is selected, a priority order setting window is displayed (0701). Referring to FIG. 11, reference numeral 1101 denotes a container; 1102, a pop-up menu; and 1103, a mouse pointer. The instruction of the container priority order setting is selected from the pop-up menu in FIG. 11. Instead, the priority order setting may be selected on a container property dialogue.

Containers associated with the container selected in step 0701 are recognized as one set, and priority orders are set (0702). In the automatic layout system, the relative layout of the associated containers is calculated in accordance with content sizes and optimized (this will be described later in detail with reference to FIG. 15). In the present invention, the priority order designates the order of calculation of the associated containers. The priority orders are set by recognizing the associated containers as one set. For example, referring to FIG. 8, text containers A, D, and F and image containers B, C, and E are laid out. The containers are associated with each other by links (e.g., 0803) so that two sets, i.e., a set of containers A, B, C, and D and a set of containers E and F are formed. When a container is selected by the mouse pointer (0804), priority orders can be set for the container set containing the selected container. For example, when the container A is selected, and priority orders are set, the priority order of each container contained in the set of the containers A, B, C, and D can be set.

Next, the priority orders set by the user are set for the containers on the priority order setting window displayed in step 0701 (0704).

The above-described procedures will be described from the viewpoint of data processing by the computer. First, the priority order setting mode is set in accordance with the operation by the user. When a container on the template of interest is selected in this mode, containers associated with the selected container by direct or indirect links are obtained from containers defined on the template, and the set of the obtained containers is stored as a container set of interest in step 0702. To do this, for example, the identifier of the selected container is recorded in a predetermined memory area as an element container of the container set of interest. In addition, the identifiers of the containers associated with the selected container are searched for by referring to link information 2604 of the template of interest. The hit container identifiers are also separately recorded in the memory as element containers of the container set of interest. Furthermore, containers associated with the newly added element containers are searched for by referring to the link information 2604. In this way, for all element containers which are newly added by each search operation, containers associated by links are searched for. If a new container is found, its identifier is additionally recorded in the memory as an element container. When search is ended for all element containers, and no new container is found, search for all elements of the container set of interest is ended. The above-described processing is executed in step 0702.

In step 0702, priority order information 2606 may be referred to first. If priority orders have been given to the container set of interest, all the identifiers of the element containers of the container set of interest are already stored in the priority order information. Hence, the processing for searching the link information can be omitted. In this case, if the identifier of the selected container is not contained in the priority order information 2606, procedures for newly setting priority orders are executed. Hence, the identifiers of the element containers of the container set are collected by searching the link information.

In step 0703, priority order information corresponding to a priority order input by the operator is stored as the priority order information 2606. The priority order is designated by the order of the element containers of the container set of interest, as will be described with reference to FIG. 9. The identifiers of the element containers are arranged in accordance with the designated order, or a value (e.g., a numerical value representing the order) representing the priority order is made to correspond to each identifier and stored for each container set. For example, assume that priority orders are given to the containers A, B, C, and D shown in FIG. 8, which are contained in the container set as elements, in this order. The priority order information 2606 is stored as information of identifiers "A, B, C, D" arranged in this order or information containing identifiers and corresponding priority orders "A:1, B:2, C:3, D:4". This is merely an example, and the priority order information can take any other form which allows identification of the container set and the priority order of each container element.

Finally, in step 0704, the set priority orders are displayed on the window in which the template is displayed. For example, the priority order information 2606 is referred to for the container set of interest, and the identifiers of the element containers are arranged in order in accordance with the stored priority order information and displayed. This display can be implemented by various methods so that the identifiers can be displayed outside the frame of the template, or the priority orders can be superposed on container images corresponding to the identifiers. The container of interest is determined by, e.g., the position of the mouse cursor. When the mouse cursor is present on a container or link, a container set containing the container as an element or a container set containing a container associated by the link is defined as a container set of interest. This determination can be implemented by comparing the display range of an object representing a container or link with the position of the mouse pointer.

Figure 9:
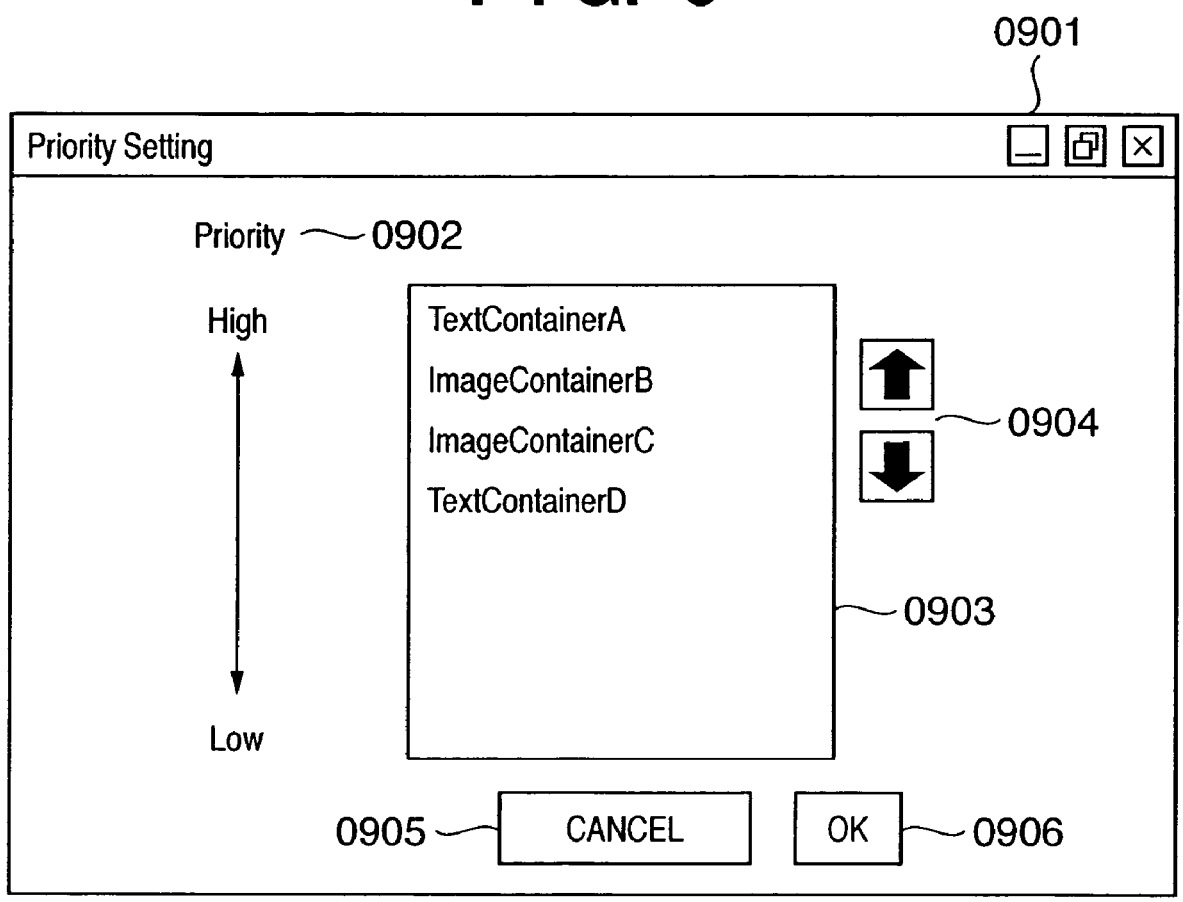
FIG. 9 is a view showing an example of a dialogue for setting the priority order in the first embodiment of the present invention.

FIG. 9 shows a dialogue UI for setting the priority order. Reference numeral 0901 denotes a dialogue; 0902, a UI representing the priority order; and 0903, a list box in which containers for which the priority orders are to be set are displayed. All containers recognized as one set in step 0702 are displayed. Arrow buttons 0904 are used to change the priority order. A cancel button 0905 is used to cancel the setting. An OK button 0906 is used to reflect the setting. As indicated by the UI 0902, the priority order of the container displayed in the list box (0903) becomes high to the upper side and low to the lower side. Calculation is executed in descending order. Referring to FIG. 9, calculation is done for the text container A, image container B, image container C, and text container D in this order.

Figure 10A:
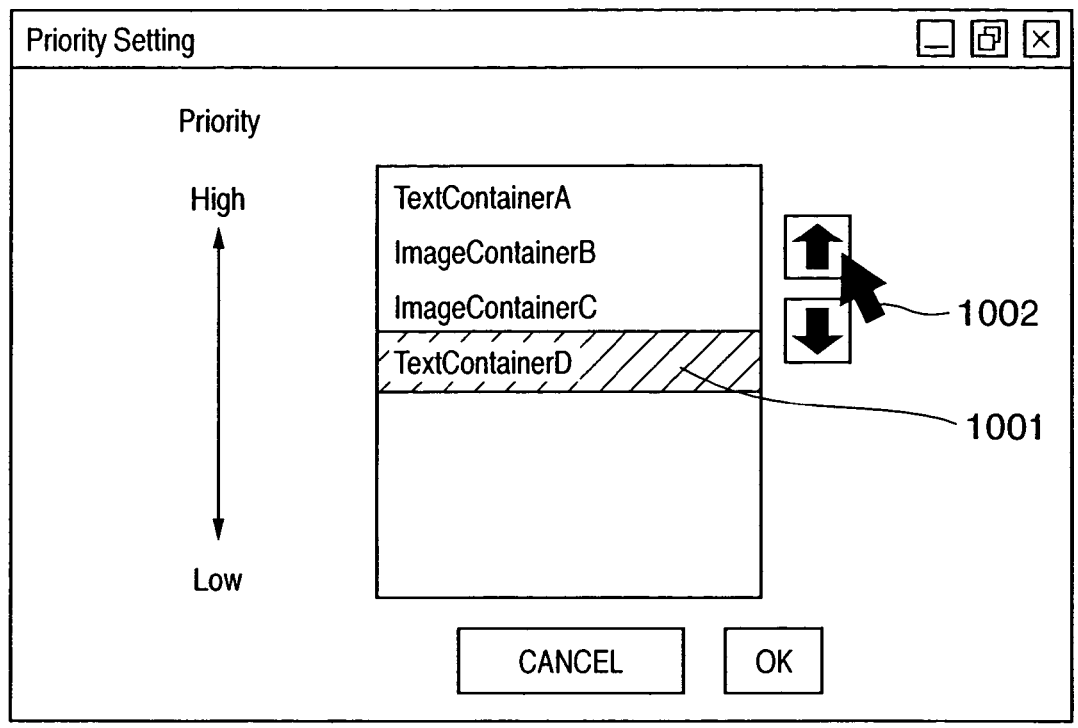
FIGS. 10A and 10B are views showing an operation example of the dialogue for setting the priority order in the first embodiment of the present invention.
Figure 10B:
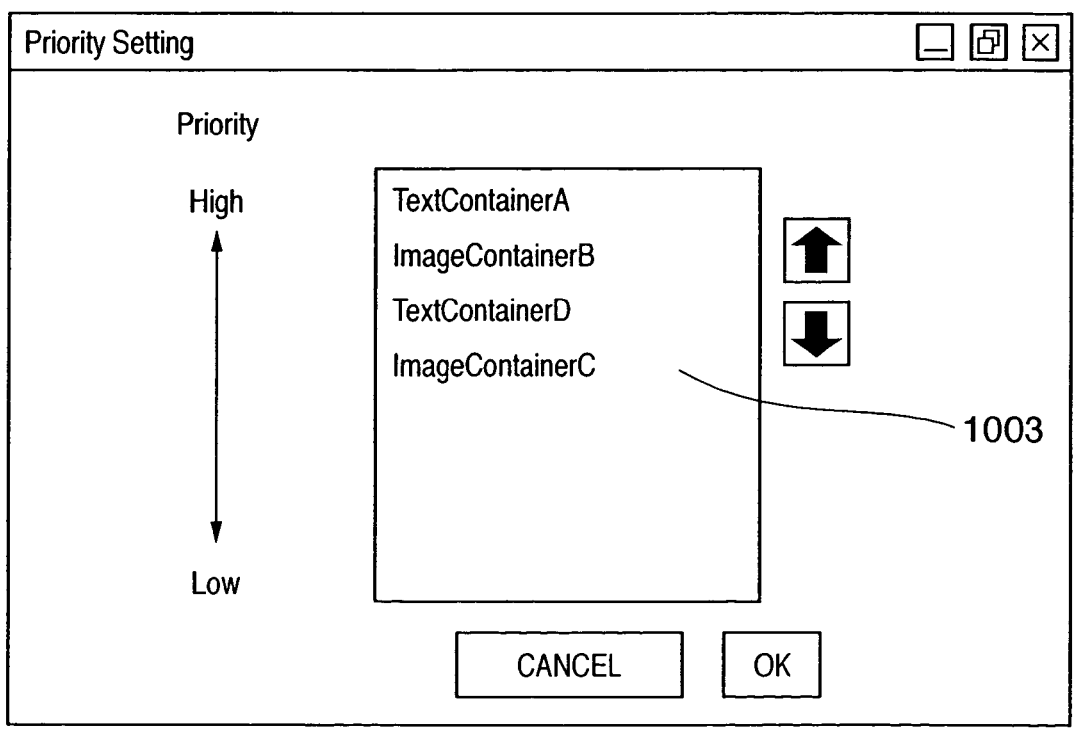

FIGS. 10A and 10B show a method of causing the operator to change the priority order in step 0703 in FIG. 7. As indicated by a select field 1001 in FIG. 10A, a container name whose priority order is to be changed is selected by the mouse pointer. To raise the priority order, the up button is clicked on. To lower the priority order, the down button (1002) is clicked on. Assume that the text container D is selected, and the operation of raising the priority order is performed. In this case, as shown in FIG. 10B, the priority order of the text container D rises by one, and the priority order of the image container C drops by one.

The priority order setting method is not limited to this. In this example, the priority orders are set for the four containers A, B, C, and D. The priorities of the containers may be designated for the containers by numbers, like No. 1, No. 2, . . .

The priority orders designated by the operator in correspondence with the containers are stored as the priority order information 2606.

<Priority Order Display Method>

Figure 12:
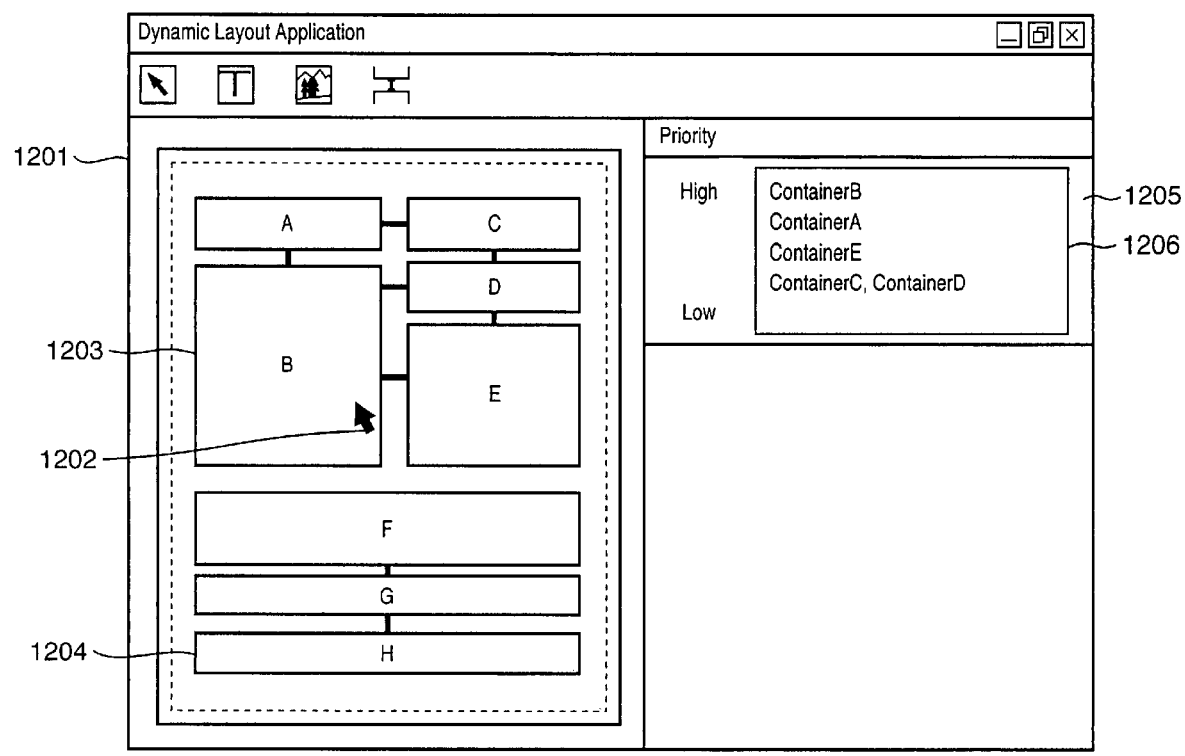
FIG. 12 is a view showing an example of a UI which presents the priority order to the user in the first embodiment of the present invention.
Figure 14:
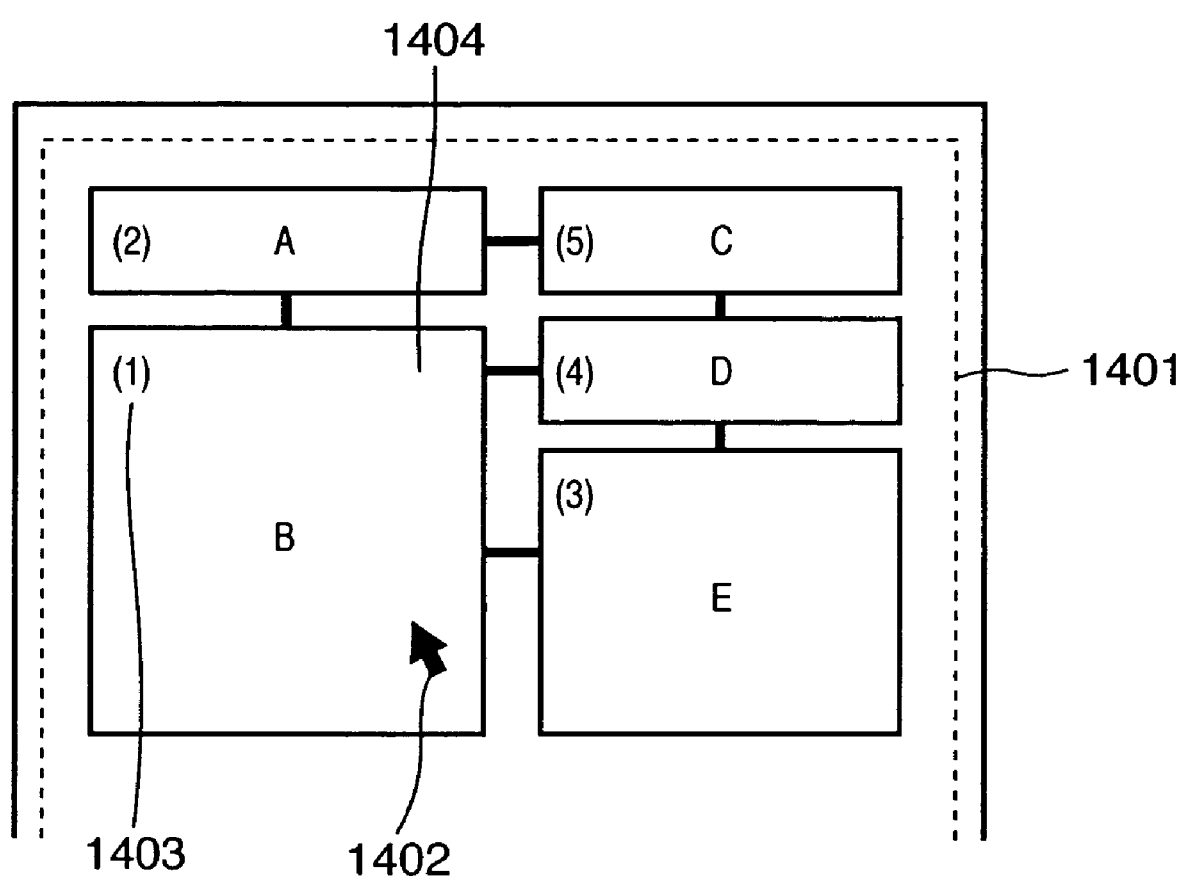
FIG. 14 is a view showing an example of a UI which presents the priority order to the user in the first embodiment of the present invention.

FIGS. 12, 13, and 14 are views showing methods of visually presenting the priority orders set for the containers to the user in step 0704 in FIG. 7. The methods will be described.

FIGS. 12 and 13 show a method of displaying the set priority orders in a separate window. FIG. 12 shows display when the mouse cursor is placed on an element container belonging to a container set 1203. FIG. 13 shows display when the mouse cursor is placed on an element container belonging to a container set 1204. Referring to FIG. 12, a window 1201 is an automatic layout application (corresponding to the program to implement the document processing apparatus of this embodiment) window. The page area, tool bar, and the like are the same as in FIG. 3. The remaining components are not illustrated in FIG. 12. A mouse pointer 1202 and the container sets 1203 and 1204 are displayed in the window. Priority orders are set for the container sets 1203 and 1204. A property palette 1205 is displayed outside the frame of the template, in which the priority orders are displayed. Container names are displayed in a list box 1206. Even referring to FIG. 13, reference numeral 1301 denotes a mouse pointer; and 1302, a list box.

Referring to FIGS. 12 and 13, the priority orders of containers are visually presented to the user by the palette 1205 and list boxes 1206 and 1302. In the list boxes 1206 and 1302, the container names are displayed in descending order of priority. As shown in FIG. 12, when the mouse pointer 1202 is placed on the container set 1203 (i.e., the object of an element container or a link), the element containers (containers A, B, C, D, and E) in the set are displayed in the list box 1206 in descending order of priority. In this example, the priority becomes low in the order of containers B, A, E, C, and D.

As shown in FIG. 13, when the mouse pointer 1301 is moved to another container set 1204, the display in the list box 1302 is updated, and the containers F, G, and H are displayed in descending order of priority. In this example, the priority becomes low in the order of containers F, H, and G.

<Preview Display Processing>

Figure 15:
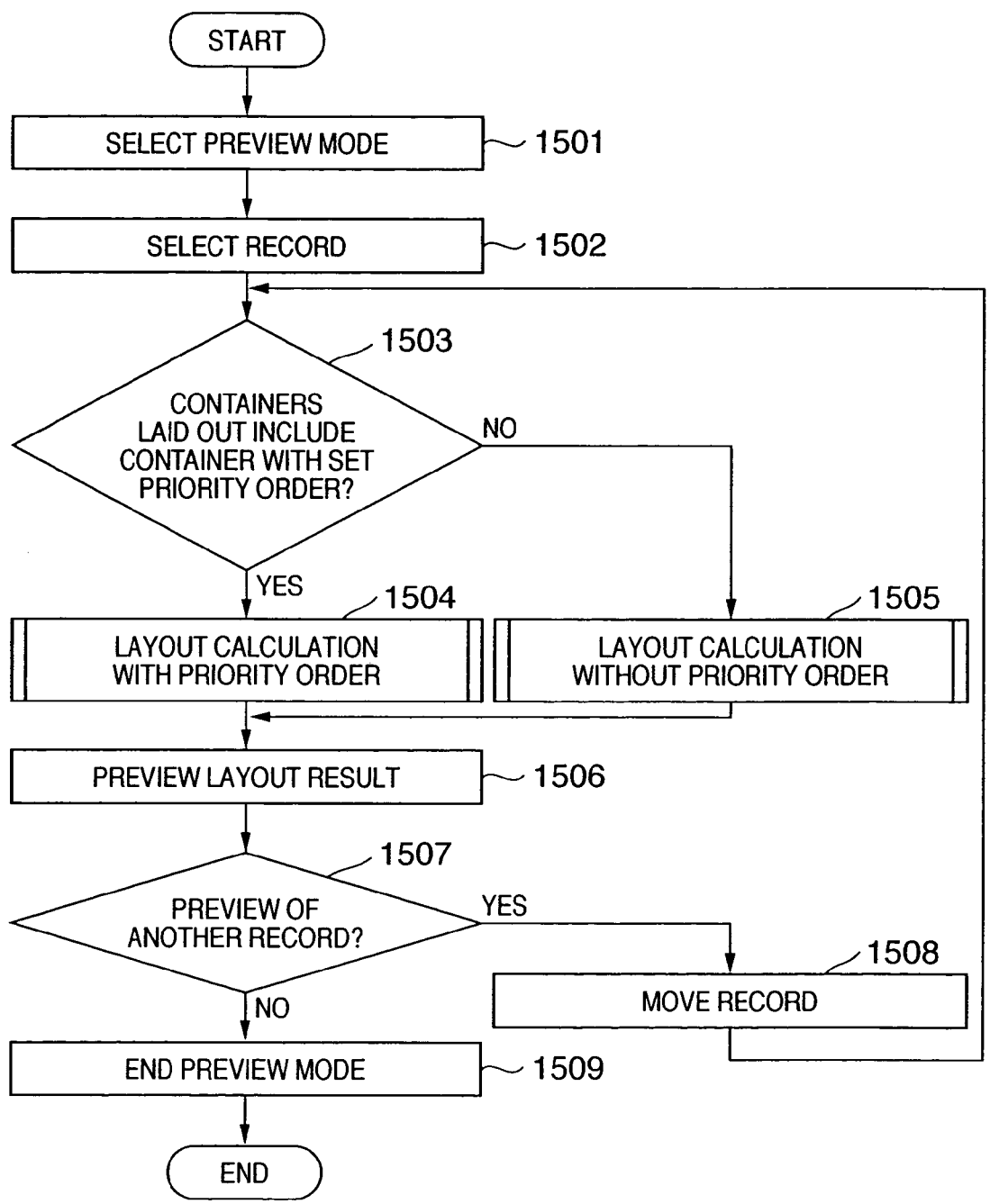
FIG. 15 is a flowchart showing the overall flow of layout calculation according to the present invention.

FIG. 15 shows the flow of the layout preview mode using a template. This processing is also executed by the computer shown in FIGS. 1A to 2. First, when the preview mode is selected by the operator, processing in the preview mode starts (1501). The above-described automatic layout system has a layout mode (FIG. 25) in which containers are created, and a layout is created by associating the containers with each other, and a preview mode in which records are inserted in the created layout, and the layout result after actual record insertion is previewed. In the preview mode, actual records are inserted, and the layout is calculated in accordance with the above-described priority order. However, in the preview mode, layout calculation for display is done. Even in actual printing, layout calculation is done by inserting records. The calculation method at this time is the same as in the preview mode.

In the preview mode, a record to be previewed is selected in accordance with the operation by the operator (1502). When a record is selected, and a preview execution instruction is given by the operator, calculation is executed to lay out the selected record. First, it is checked whether the above-described priority orders are set for the containers (1503). To do this, it is checked by referring to the priority order information 2606 of template data 2601 whether priority order information of some kind is stored. If it is determined by this check that a container having a set priority order is present, i.e., when priority order information of some kind is stored in the priority order information 2606, the layout is calculated under a condition "priority order is present" (1504). The layout calculation method under the condition "priority order is present" will be described later in detail with reference to FIG. 19. If it is determined in step 1503 that no container having a set priority order is present, the layout is calculated under a condition "priority order is absent" (1505). This processing will be described later with reference to FIG. 16.

The data layout calculated in step 1504 or 1505 is displayed (1506). In a print mode, the data is transmitted to the printer and printed. It is determined whether to preview another record (1507). If NO in step 1507, the preview mode is ended (1509). If YES in step 1507, another record is selected, layout calculation is executed again, and preview is done (1508). Not in the preview mode but in the print mode, layout calculation is done sequentially for all records to be printed. Hence, steps 1507 and 1509 are not present. When printing is ended for all records, the processing is ended.

<Layout Calculation Method (Without Priority Order)>

Figure 17A:
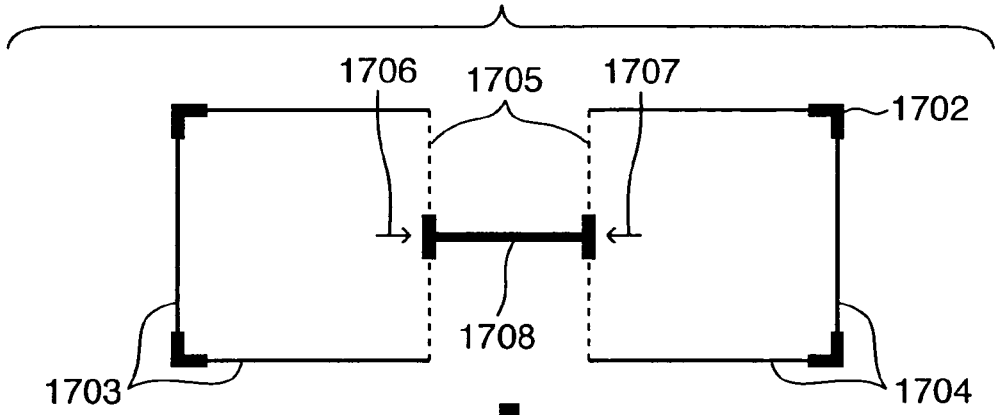
FIGS. 17A to 17C are views showing examples of a UI corresponding to the flow shown in FIG. 16 of the present invention.
Figure 17B:
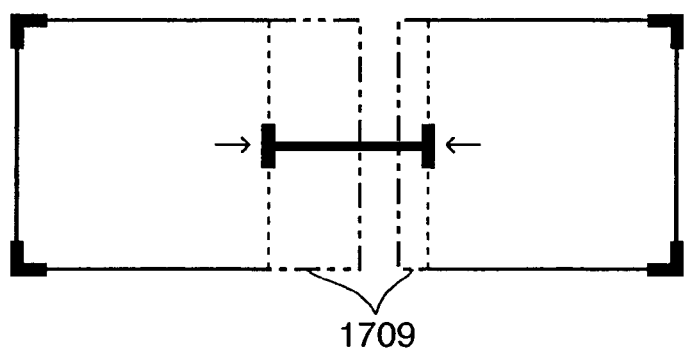
Figure 17C:
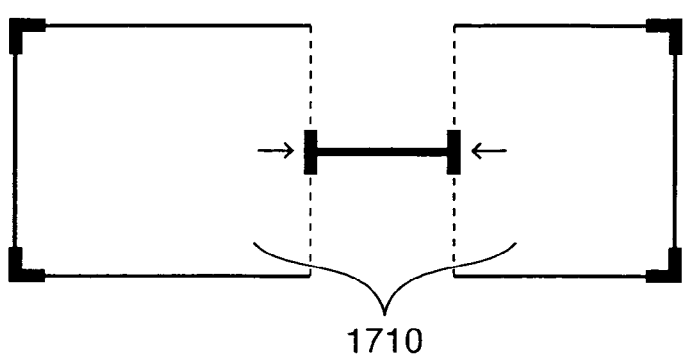

FIG. 16 is a flowchart showing layout calculation procedures in step 1505 in FIG. 15 when no priority order is set. FIGS. 17A to 17C are views showing display examples of the UI at that time.

Figure 18:
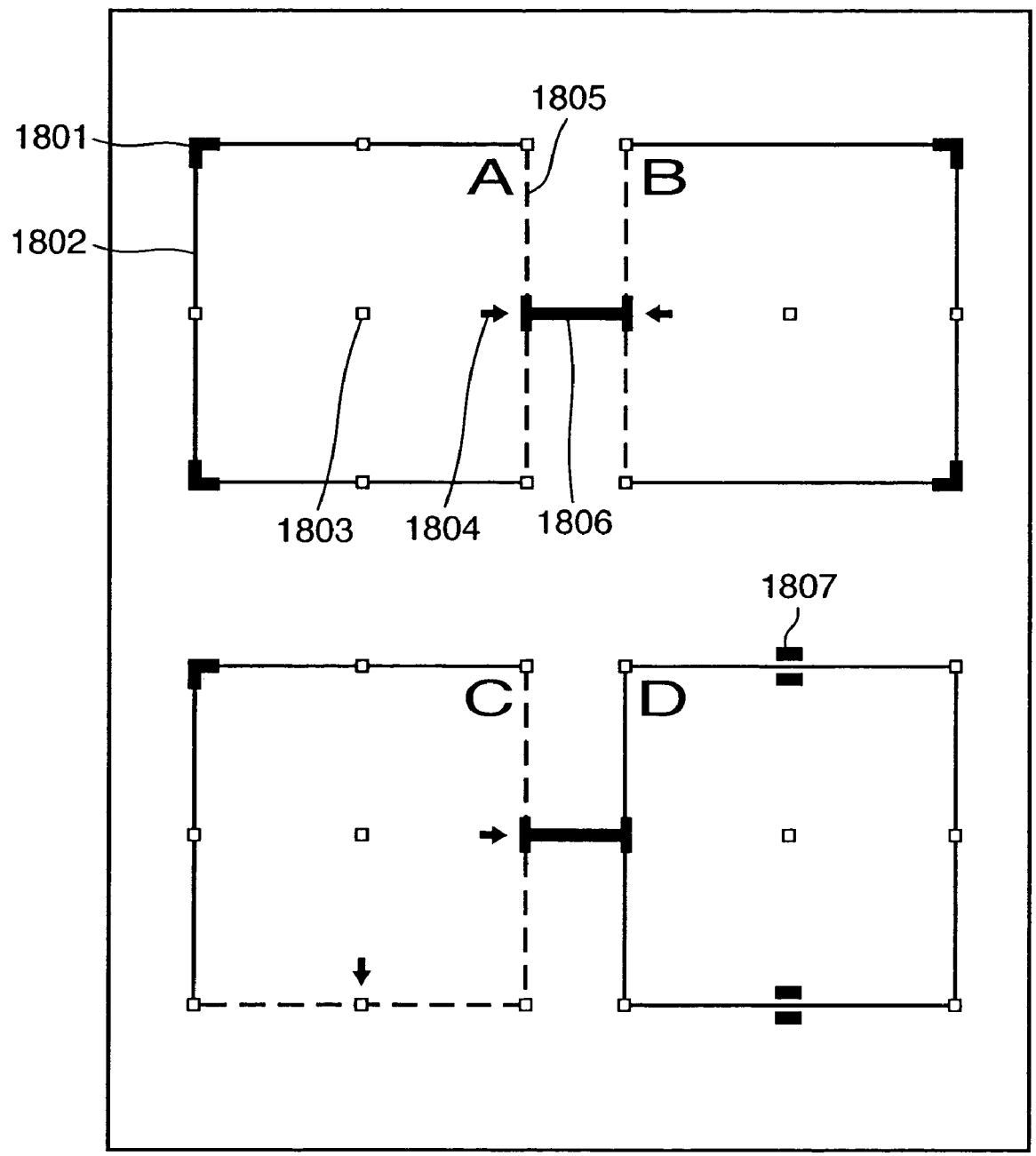
FIG. 18 is a view for explaining a container set in layout calculation according to the present invention.

First, container sets to be subjected to layout calculation are obtained (1601). Layout calculation is executed for each set of containers associated with each other. Referring to, e.g., FIG. 18, four containers are laid out on a page and associated with each other. In this case, containers A and B are associated by a link, and containers C and D are also associated by a link. Hence, the containers A and B form set 1, and containers C and D form set 2. As described above, reference numeral 1801 denotes an anchor; 1802, a fixed side; 1803, a controller; 1804, an arrow which indicates the change direction of a variable side; 1805, a variable side; 1806, a link; and 1807, a slider.

In the processing shown in FIG. 16, information to specify a container set cannot be obtained from the priority order information 2606. The information is acquired by referring to the link information 2604. More specifically, the identifier of an appropriate one of containers laid out in the template is selected. The identifiers of containers directly or indirectly associated with the container of the selected identifier are acquired by searching the link information. The acquired container identifiers are recorded in the memory as the element containers of the container set of interest. This processing is the same as step 0702 in FIG. 7.

A container is selected from the container set obtained in step 1601 to calculate the layout (1602). Content data to be laid out is acquired (1603). The data to be laid out is data contained in the record selected in step 1502 or 1508. The content data contains the contents, size, and amount of the content. The size of data to be inserted in a corresponding container is obtained from the acquired content data (1604). The size of each container is calculated on the basis of the size of obtained content data (1605).

When the container size is calculated in step 1605, the size and position of each container are determined (1606). Since the layout is not optimized yet, the obtained size and position are temporarily determined. Next, the layout is optimized such that the difference between the size of each container to be laid out and the actual content size becomes as small as possible (1607). The layout is optimized such that the difference between the size of the content to be inserted and the size of layout becomes as equal as possible between the containers associated with each other to dynamically change their sizes. The layout is optimized. If a violation of rules has occurred, calculation is done again to prevent any violation of rules (1608). The rules described here are constraints set by the user in creating the layout. Examples of the constraints are the size and position of a container and the length of a link. When the layout is calculated without any violation of rules, the size and position of each container in the set are determined, and the layout is completed (1609). Finally, corresponding contents are inserted in the containers having the determined sizes and positions (1610). The processing in steps 1602 to 1610 is executed for all sets on the page. The layout of the entire page is thus calculated (1611).

FIGS. 17A to 17C show examples of the UI in the layout mode without setting any priority order. FIG. 17A shows a state in which records are inserted, and the layout is determined. Reference numerals 1701 and 1702 denote anchors; 1703 and 1704, fixed sides; 1705, a variable side; 1706, an arrow which indicates the change direction of a variable side; and 1708, a link. In this state, the records are changed, and contents having different sizes are inserted. FIG. 17B shows the new container sizes after layout calculation, which are superposed on the state shown in FIG. 17A. Alternate long and two short dashed lines 1709 indicate the sizes of contents to be inserted in the respective containers. Layout calculation is executed. FIG. 17C shows the result of layout calculation. The sizes of containers after layout calculation are calculated such that they have the same difference to the size of the content to be actually inserted, and no violation of the above-described rules occurs. In the example shown in FIGS. 17A to 17C, the outer sides and upper and lower sides of the two linked containers are fixed by anchors. For this reason, the changeable inner sides are moved in accordance with the container sizes so that the positions and sizes of the containers are determined. As shown in FIG. 17C, content sizes (1709) to be inserted shown in FIG. 17B and the content sizes (1710) after calculation have the same difference.

If one container has two or more variable sides, they are moved by the same amount in accordance with the change in content size. When a container area necessary for receiving the content is obtained, the corresponding container moves sides except fixed sides in the same direction (outward or inward) by the equidistance. Accordingly, the position of each side (or the position of each corner point) is determined in accordance with the obtained area. When the necessary positions and sizes of the linked containers are determined, the sides connected by the link are moved in accordance with the relative positional relationship regulated by the link. More specifically, after the containers with the necessary sizes are obtained, the distance between the sides connected by the link is calculated. The sides are moved from their positions by the equidistance such that the distance defined by the link is obtained. In this way, the containers are determined, and contents are inserted in them.

<Layout Calculation Method (With Priority Order)>

Figure 19:
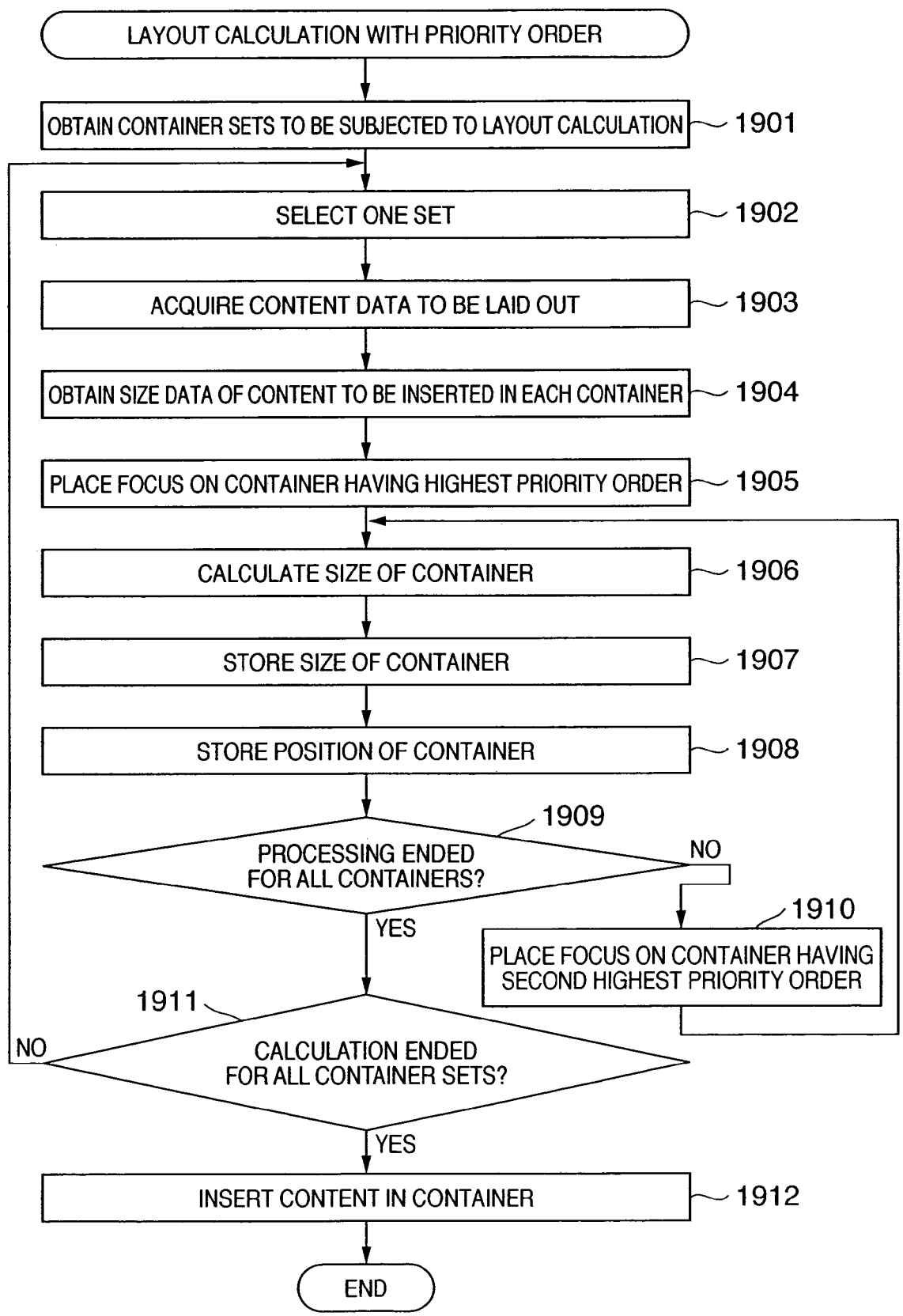
FIG. 19 is a flowchart showing the flow of layout calculation with priority order according to the present invention.
Figure 20:
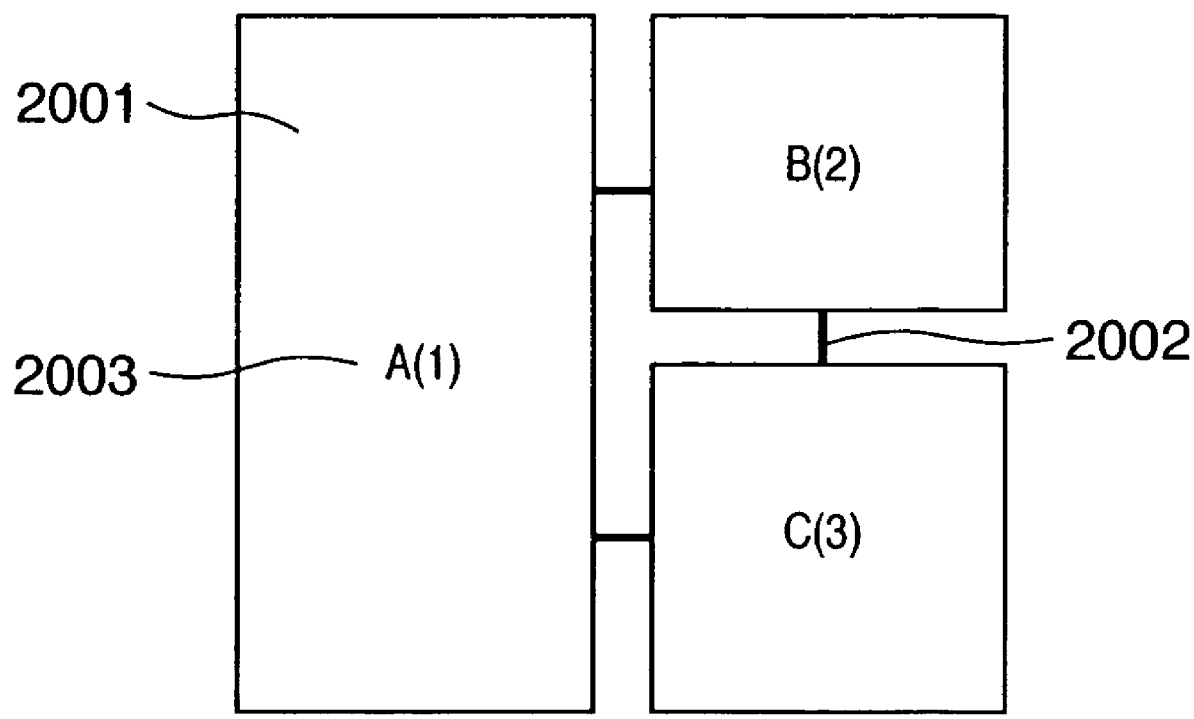
FIG. 20 is a view showing an example of a UI corresponding to the flow shown in FIG. 19 of the present invention.
Figure 21A:
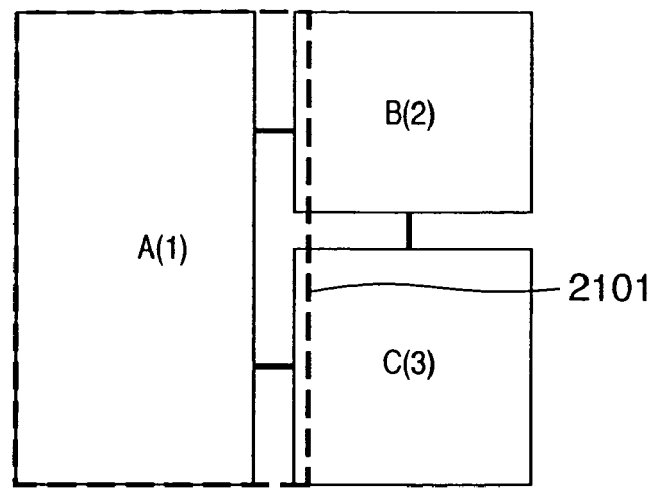
FIGS. 21A to 21C are views showing examples of a UI corresponding to the flow shown in FIG. 19 of the present invention.

FIG. 19 is a flowchart showing layout calculation procedures in step 1504 in FIG. 15 when priority orders are set for containers. FIGS. 20 and 21 are views showing display examples of the UI at that time. A description will be done with reference to FIGS. 19 to 21.

Referring to FIG. 20, reference numeral 2001 denotes a container; 2003, a priority order; and 2002, a link. Each priority order is indicated by a circled number. The smaller the number becomes, the higher the priority order becomes. The priority orders are given in the order of containers A, B, and C. A dotted line 2101 in FIG. 21A indicates the size of a content to be inserted in the container A. A frame line 2102 indicates a container A' after layout calculation of the container A. A dotted line 2103 indicates the size of a content to be inserted in the container B. A frame line 2104 indicates a container B' after layout calculation of the container B. A frame line 2105 indicates a container C' after layout calculation of the container C.

First, referring to FIG. 19, container sets to be subjected to layout calculation are obtained (1901). A set for calculation is selected (1902). The set corresponds to the containers A, B, and C in FIG. 20. Content data to be laid out is acquired (1903). The content data described here contains the contents, size, and amount of contents. The data size of the content data acquired for each container is obtained (1904). The procedures in steps 1901 to 1904 are the same as in steps 1601 to 1604 in FIG. 16. To obtain the element containers of the container set of interest, the priority order information 2606 is referred to, and the container identifiers stored in the priority order information 2606 together with priority orders are acquired.

Next, focus is placed on the container with the highest priority order (1905). The container with the highest priority order, which is acquired by referring to the priority order information 2606, is defined as the container of interest. The identifier of the container of interest is stored in, e.g., a predetermined memory area and referred to as needed. In the example shown in FIGS. 21A to 21C, the container A has the highest priority order. Hence, focus is placed on the container A. Layout calculation is executed for the container of interest (1906). The size of the container is calculated by using the content data size obtained in step 1904. The dotted line 2101 in FIG. 21A indicates the content size obtained for the container A. The container of interest can influence the size or position of a container having a lower priority order as long as no violation of rules occurs. Instead, the container of interest cannot influence a container having a higher priority order. In the example shown in FIG. 21A, in layout calculation of the container A, the size to receive the content can be increased independently of the sizes of the containers B and C having lower priority orders than the container A. The container size and position calculated in step 1906 are stored in the memory (1907 and 1908). The frame line 2102 in FIG. 21B indicates the container after calculation for the container A is ended, and the size and position are determined (stored).

Figure 21B:
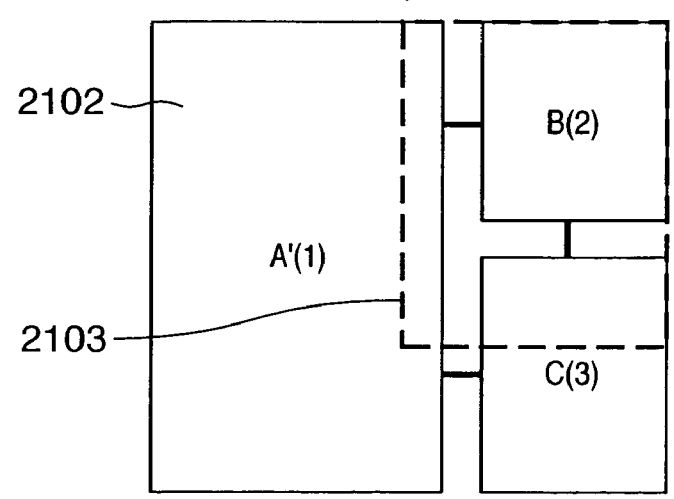

Next, it is confirmed whether the calculation is ended for all containers in the selected set (1909). If NO in step 1909, focus is placed on the container having the priority order highest next to the current container of interest. Processing in steps 1906 to 1908 is executed for the container, and the container size and position are calculated (1910). In FIG. 21B, after the calculation of the container A is ended, calculation is executed for the container B having the next highest priority order. The dotted line 2103 in FIG. 21B indicates the content size obtained for the container B. On the basis of the content size, the size and position of the container B are calculated. Since the priority order of the container B is lower than that of the container A, the container B cannot influence the container A. The size and position of the container A are already stored as determined values in the preceding step. Hence, the position and size of the container B must be calculated without affecting the container A. As indicated by the dotted line 2103, the size of the content to be inserted in the container B overlaps the container A'. Hence, the container B is given in a size smaller than the content size.

Figure 21C:
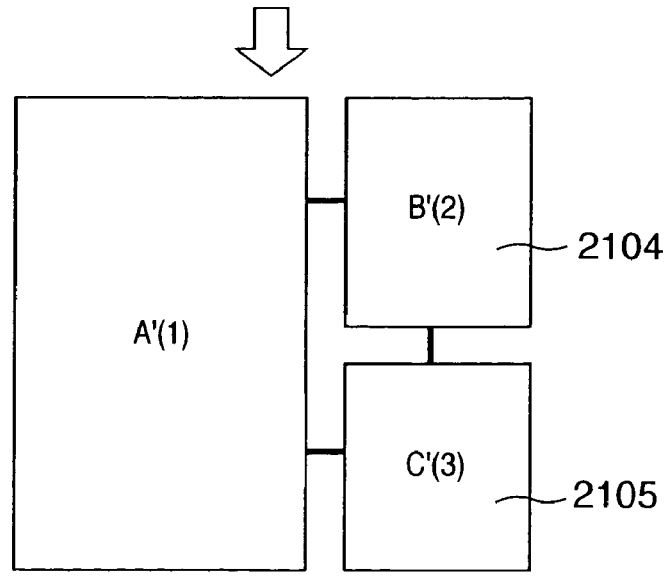

FIG. 21C shows the container B' after the calculation for it is ended, and the size and position are determined. The container B' is smaller than the actual content size indicated by the dotted line 2103. In this example, the container B is restricted not only by the container A' having the higher priority order but also by the container C. This is because the container B is restricted by a reason except the priority order, and for example, the fixed upper side of the container C.

After the layout calculation of the container B is ended, layout calculation is executed for the container C having the next highest priority order. In the example shown in FIGS. 21A to 21C, the priority order of the container C is lowest in the container set. Before calculation of the container having the lowest priority order in the set is executed, the sizes and positions of all the remaining containers are already determined. For this reason, the container C cannot influence any container. When focus is placed on the container having the lowest priority order in step 1910, its size and position are often already determined. Even for the container having the lowest priority order, the size and position are calculated in steps 1906 to 1908.

When layout calculation is ended for all containers in the set, it is confirmed whether an uncalculated set remains in the page (1911). If an uncalculated set remains, the processing returns to step 1902 to execute layout calculation in accordance with the above-described procedures. If calculation is ended for all sets, the contents are inserted in the calculated containers (1912).

In calculating the container size and position, which side of the container of interest cannot be moved is determined. Next, the remaining sides, i.e., movable sides are moved such that the container size and content size coincide with each other, thereby determining the positions of the sides. If the moving amount is limited, the positions of the sides are determined such that the container size is close to the content size as much as possible. An unmovable side indicates a side which is fixed by an anchor or a side which cannot move because the distance from a container having a higher priority order than the container of interest is fixed to a predetermined distance (i.e., the container is associated by a link). A side fixed by an anchor cannot be moved because a side position stored as container information is the position of that side. Whether a side is fixed by an anchor can be inverted by the attribute of the side. The position of a side which cannot move because of a container having a higher priority order can be obtained by adding the distance defined by link information to the already determined position of a side of the container having the higher priority order.

Next, the position of a variable side is determined. To do this, first, the container size (the length of each side) when the unmovable sides are fixed, and the container size equals the content size is calculated. When a plurality of variable sides are present, the length of each side is calculated such that the moving amounts of the sides from positions defined by the template become equal. The side lengths are added in each of the vertical and horizontal directions by using the position of the unmovable side as a reference. Accordingly, the position of each side can be determined. In this state, if a side violates a constraint, the side is moved in accordance with the constraint. For example, if a side projects from the outer frame of the page, the position of the side is changed to the position of the outer frame of the page. The side moved in accordance with the constraint changes to an unmovable side. The side is added to the unmovable sides, and the above-described procedures are repeated again, thereby determining the position of each variable side.

When the positions of all sides are determined without violating the constraints or all sides are changed to unmovable sides by the procedures, the position and size of the container of interest are determined.

The present invention can also be applied to a template in which both container sets with designated priority orders and container sets without designated priority orders are present in the following way. If a container set which is not focused yet is present in the page, it is determined whether the container set includes a container having a designated priority order, i.e., a container stored in the priority order information. If there is a container having a designated priority order, focus is placed on the container set, and processing from step 1903 is repeated. Processing from step 1902 in FIG. 19 is executed. On the other hand, if the remaining container sets include no container having a designated priority order, the flow branches to step 1602 in FIG. 16. In this way, a layout can be obtained in accordance with the priority order even when containers having priority orders and those without priority orders are present.

As described above, the embodiment of the present invention comprises a creation means for creating a template having priority order information designated for each region (container), and a preview display means for displaying a preview of the created template together with the priority order information.

The preview display means can display each container contained in the created template while adding an identifier to the container, and a list in which the identifiers of the containers are arranged in accordance with the priority order.

The template contains link information which associates the containers. The priority order information represents the priority orders of containers associated by a link. A layout means can lay out data in the containers while maintaining the association by the link.

In the above-described manner, a priority order is given to each region where data is laid out on a template, thereby increasing the degree of freedom of data layout. In addition, the layout result predictability can be increased by displaying the priority order for each region.

In addition, since priority orders can be given to containers associated by a link, the priority orders can be given to desired containers arranged in the template so that the degree of freedom of layout further increases.

For container sets which are not associated by a link, priority orders can be designated independently. For this reason, the degree of freedom of layout further increases.

Modification to First Embodiment

FIG. 14 shows a priority order display method different from that in FIGS. 12 and 13. Referring to FIG. 14, reference numeral 1401 denotes a page margin which indicates a page area; 1402, a mouse pointer; 1403, a number which indicates the priority order of a container; and 1404, a container set in which the priority order is set. In the method shown in FIG. 14, when the mouse pointer is moved onto a container, the priority orders set for containers associated with the container are displayed by the numbers. In this example, the mouse pointer is located on the container B. Then, the priority orders set for the containers A, C, D, and E associated with the container B are displayed on them. The smaller the number is, the higher the priority order is. That is, (1) indicates the highest priority order. Referring to FIG. 14, the priority orders are set in the order of containers B, A, E, D, and C.

With this display method, the correspondence between the priority orders and the containers can intuitively be grasped, and the operability can be increased.

Second Embodiment

The second embodiment of the present invention is directed to the above-described priority order setting method and display method. The second embodiment is the same as the first embodiment except the points to be described below.

<Priority Order Setting and Display Method>

Figure 22:
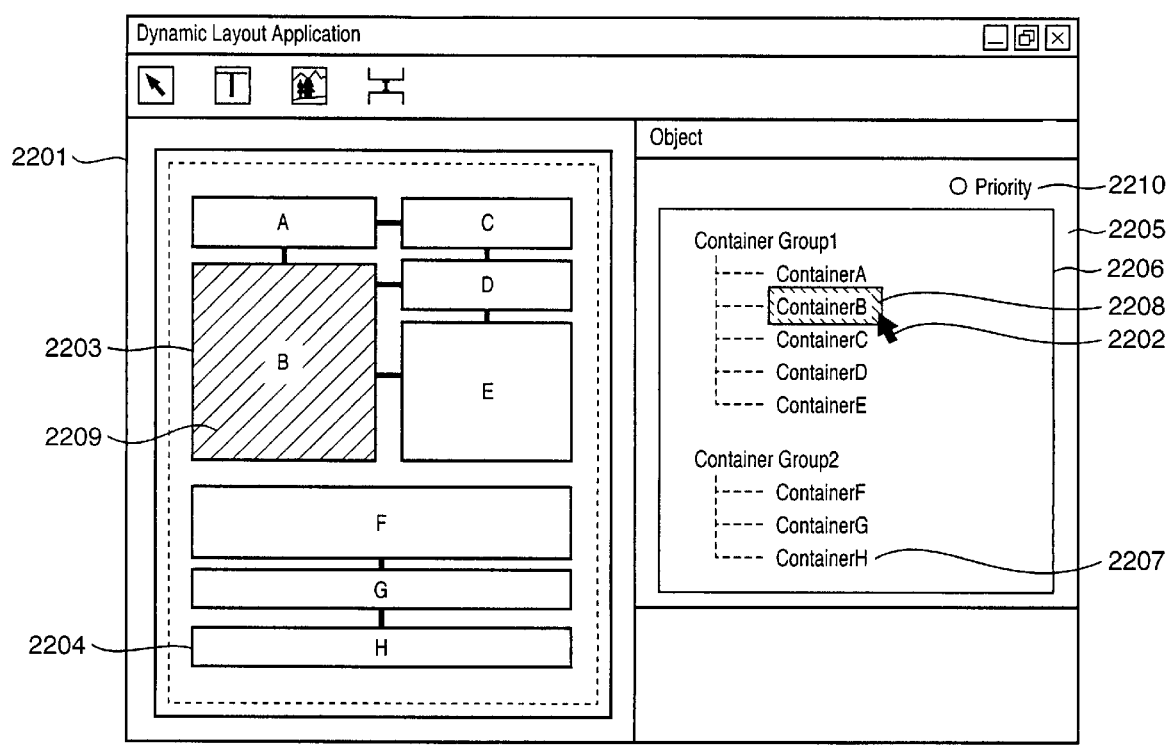
FIG. 22 is a view showing a priority order setting method and a UI according to the second embodiment of the present invention.

Referring to FIG. 22, reference numeral 2201 denotes an application window; 2202, a mouse pointer; 2203 and 2204, container sets; 2205, an object palette in which the information of each created container is displayed; 2206, a list box in which the names of the created containers in the object palette are displayed; 2207, a name of a created container; 2208, a name of a container selected by the mouse pointer; 2209, an example in which the display state is changed to indicate that the container UI corresponding to the container name selected by the mouse pointer is selected, and 2210, a radio button capable of turning on/off the priority order setting.

First, the user creates containers and sets links between them. Pieces of container information are listed in the object palette 2205 in accordance with the created containers and links. In this example, containers A, B, C, D, E, F, G, and H are created. A group (container set) is formed by setting association between the containers A, B, C, D, and E by links. Another group is formed by setting association between the containers F, G, and H by links. Hence, in the list box 2205 in the object palette, the containers A, B, C, D, and E are listed as "Container Group 1", and the containers F, G, and H are listed as "Container Group 2". When a container or container group in the list box is selected by the mouse pointer 2202, the display changes to indicate that the container is selected (highlight 2208). The display of the container in the layout area, which corresponds to the selected container name, also changes to indicate that the container is selected (2209). In this example, the selected container is indicated by hatching. However, any other method can be used.

In the object palette 2205, when "priority order" is turned on by using the radio button 2210, priority orders are set sequentially from the upper side for the container names displayed in the list box. In, e.g., container group 1, priority orders are set in the order of containers A, B, C, D, and E. In the default state, the containers are listed in the order of creation. The priority order changing method will be described later.

Figure 23:
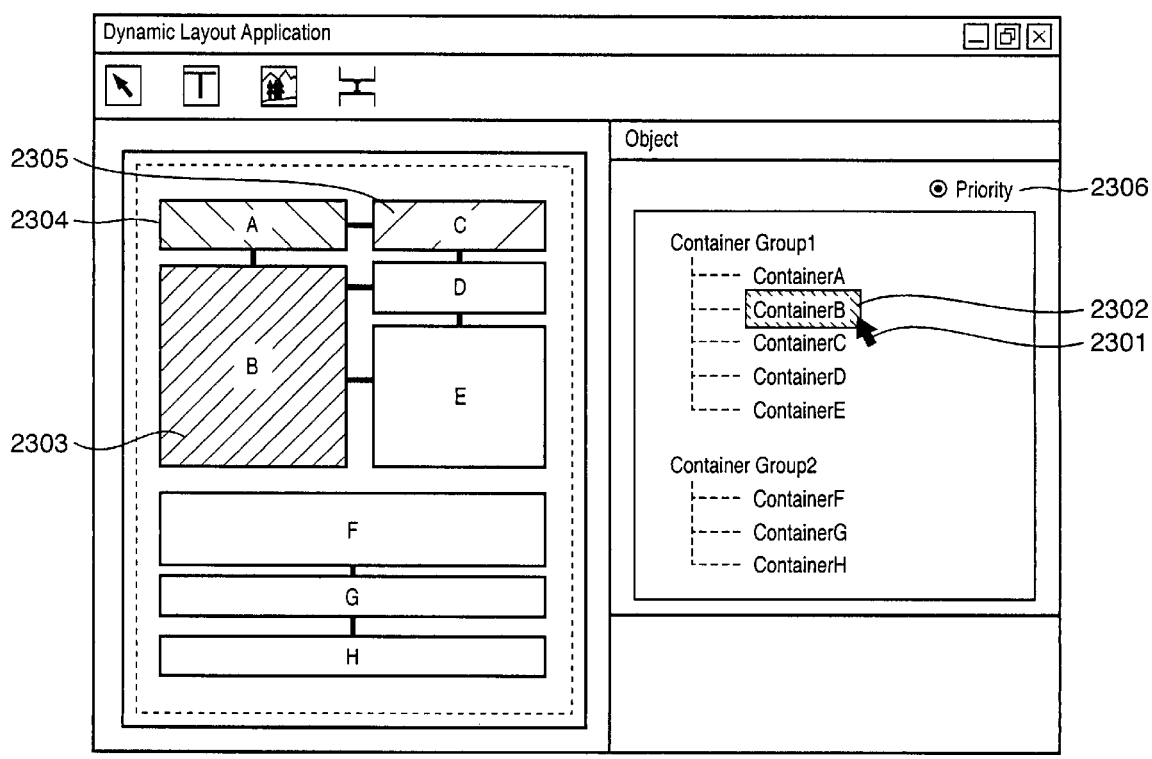
FIG. 23 is a view showing a priority order setting method and a UI according to the second embodiment of the present invention.

As shown in FIG. 23, in the "priority order" ON state (2306), a container name in the list box is selected by a mouse pointer (2301). In this case, the container B is selected. As described above, the display of the selected container changes to indicate that the container is selected (highlight 2302). Since "priority order" is ON, priority orders are set sequentially from the upper side for the containers displayed in the list box. Hence, the container which has a lower priority order next to the container B is the container C. The container which has a higher priority order than the container B by one level is the container A. Together with the selected container, the containers A and C also change their display to indicate to the user that the containers are selected, like the selected container B which changes its display in the layout area to the region 2303. The display of the container A changes to shading, and the container C changes to a polka dot pattern. Accordingly, the user can visually confirm the priority orders before and after the selected container B. The container display method is not limited to the above-described change method. Any other method can be used if it can appeal an adjacent priority order.

The user interface window has been described above. The above-described display is done in step 0704 in FIG. 7 of the procedures of display processing. The template data only needs to have the structure shown in FIG. 26. To implement the above display, identifiers (container group numbers) are assigned to the container sets on the basis of the priority order information of each of all the container sets stored in priority order information 2606. The container identifiers are listed sequentially in the list box in accordance with the priority order information stored for each container set. When a container identifier on the list is selected, the container in the template corresponding to the selected identifier is distinguishably displayed by, e.g., hatching (FIG. 22).

In addition, container identifiers having priority orders before and after the selected container identifier are read by referring to the priority order information. The containers in the template corresponding to the identifiers are distinguishably displayed (FIG. 23).

<Priority Order Changing Method>

The priority orders can be changed by using the object palette shown in FIGS. 22 and 23. FIGS. 24A to 24D show the changing method. Reference numeral 2401 denotes an object palette; 2404, a list box; 2403, a priority order setting radio button; 2404, a mouse pointer; 2405, a container name which is selected and has changed the display; 2406 and 2407, container names which are selected by the mouse and are undergoing the drag operation; and 2408, a container name.

Figure 24A:
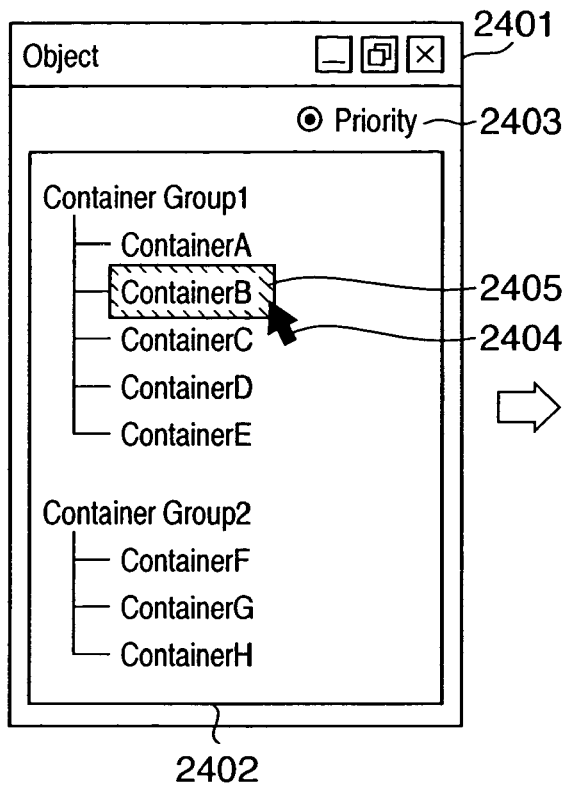
FIGS. 24A to 24D are views showing a priority order changing method according to the second embodiment of the present invention.
Figure 24B:
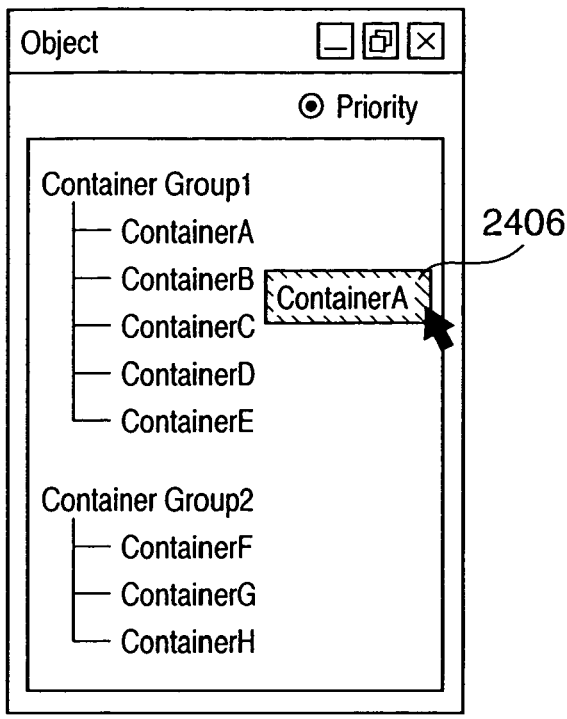
Figure 24C:
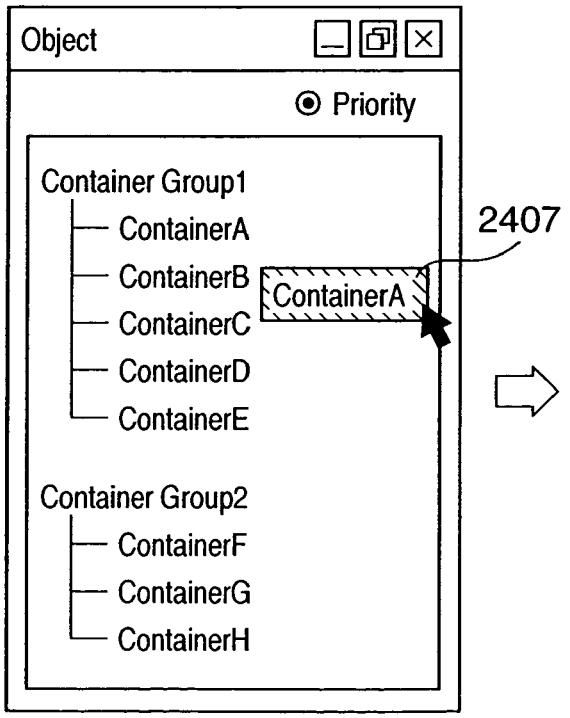
Figure 24D:
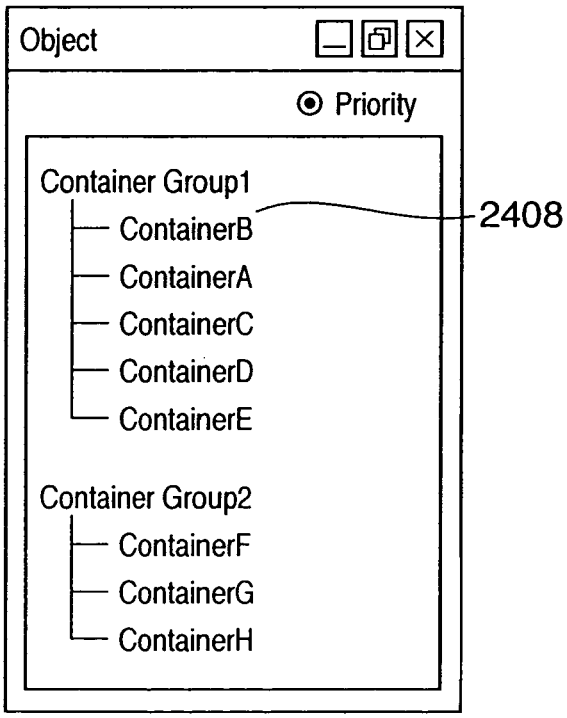

As shown in FIG. 24A, the radio button is turned on to validate priority order setting. A container name whose priority order should be changed is selected by the mouse pointer. The display of the selected container name changes to indicate that the container is selected. As shown in FIG. 24B, the selected container name is dragged by the mouse pointer (2406). The container name is displayed while being dragged by the mouse pointer to indicate that the container name is dragged. As shown in FIG. 24C, the dragged container name is dropped to the priority order change position (2407). In this example, the container A is dropped between the containers B and C. The priority orders are changed to the order of containers B, A, and C. Finally, as shown in FIG. 24D, the container names in the list box are displayed in accordance with the changed priority order, and the processing is ended.

Simultaneously, the priority order setting is also changed in accordance with the display order. According to the above-described operation, the priority order information 2606 is also updated such that the priority orders are changed.

As described above, according to this embodiment, since a priority order is given to each region where data is laid out on a template, the degree of freedom of data layout can be increased. In addition, since the priority orders can be changed by manipulating the list of priority orders, the operability can further be increased.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A document processing apparatus for performing a layout process using content data to be output and a single template in which a plurality of regions to which the content data is assigned are arranged, comprising:
    a connecting unit which connects a first region to a second region, and connects a third region to a fourth region, wherein the first, second, third and fourth regions are arranged in the single template, and displayed;
    a priority order setting unit which sets independently, for each of the first, second, third and fourth regions, a priority order which is utilized to determine a size of each region; and
    a display control unit which displays (i) information representing the priority order which is set for first region, and (ii) information representing the priority order which is set for the second region which is connected to the first region when the first region is selected by a user from among the displayed regions, and displays (iii) information representing the priority order which is set for the third region, and (iv) information representing the priority order which is set for the fourth region which is connected to the third region, when the third region is selected by the user from among the displayed regions, wherein when the user changes a selection of a region from the first region to the third region, said display control unit changes the displayed information from the information representing the priority orders set for the first and second regions into the information representing the priority orders set for the third and fourth regions.

2. The apparatus according to claim 1, further comprising a determination unit which firstly determines a size of the first region to which the first priority is set, then determines a size of the second region to which the second priority is set such that the second region can be arranged in the remaining region of the template in which the first region is not arranged.

3. A method for a document processing apparatus for performing a layout process using content data to be output and a single template in which a plurality of regions to which the content data is assigned are arranged, comprising:
    performing by a processor the following steps:
    a connecting step of connecting a first region to a second region, and connects a third region to a fourth region, wherein the first, second, third and fourth regions are arranged in the single template, and displayed;
    a priority order setting step of setting independently, for each of the first, second, third and fourth regions, a priority order which is utilized to determine a size of each region; and
    a display control step of displaying (i) information representing the priority order which is set for first region, and (ii) information representing the priority order which is set for the second region which is connected to the first region when the first region is selected by a user from among the displayed regions, and displaying (iii) information representing the priority order which is set for the third region, and (iv) information representing the priority order which is set for the fourth region which is connected to the third region, when the third region is selected by the user from among the displayed regions, wherein when the user changes a selection of a region from the first region to the third region, said display control step changes the displayed information from the information representing the priority orders set for the first and second regions into the information representing the priority orders set for the third and fourth regions.

4. The method according to claim 3, further comprising a determining step of determining a size of the first region to which the first priority is set, then determining a size of the second region to which the second priority is set such that the second region can be arranged in the remaining region of the template in which the first region is not arranged.

5. A computer-readable storage medium storing a computer program for a document processing apparatus for performing a layout process using content data to be output and a single template in which a plurality of regions to which the content data is assigned are arranged, the program comprising:

a connecting step of connecting a first region to a second region, and connects a third region to a fourth region, wherein the first, second, third and fourth regions are arranged in the single template, and displayed;

a priority order setting step of setting independently, for each of the first, second, third and fourth regions, a priority order which is utilized to determine a size of each region; and a display control step of displaying (i) information representing the priority order which is set for the first region, and (ii) information representing the priority order which is set for the second region which is connected to the first region when the first region is selected by a user from among the displayed regions, whereas displaying (iii) information representing the priority order which in set for the third region, and (iv) information representing the priority order which is set for the fourth region which is connected to the third region, when the third region is selected by the user from among the displayed regions, wherein when the user changes a selection of a region from the first region to the third region, said display control step changes the displayed information from the information representing the priority orders set for the first and second regions into the information representing the priority orders set for the third and fourth regions.

6. The computer-readable storage medium storing a computer program according to claim 5, further comprising a determining step of determining a size of the first region to which the first priority is set, then determining a size of the second region to which the second priority is set such that the second region can be arranged in the remaining region of the template in which the first region is not arranged.

7. A document processing apparatus for performing a layout process using content data to be output and a single template in which a plurality of regions to which the content data is assigned are arranged, comprising:

a defining unit which defines associated regions containing the regions connected with each other using a link specified by a user, wherein the associated regions are arranged in the single template;

a priority order setting unit which sets a priority order defining an order among the associated regions, wherein the priority order is utilized to determine a size of each of the associated regions; and a display control unit which displays the regions and, when at least one of the associated regions has been selected by a user, displays the priority order for the associated regions among which a region is currently selected, as well as the regions, wherein when a region is newly selected by a user from among the displayed regions, said display control unit changes the displayed priority order from the currently displayed priority order to the priority order for the associated regions containing the region newly selected by the user.

8. A method for a document processing apparatus for performing a layout process using content data to be output and a single template in which a plurality of regions to which the content data is assigned are arranged, comprising:

performing by a processor, the following steps:

a defining step of defining associated regions containing the regions connected with each other using a link specified by a user, wherein the associated regions are arranged in the single template;

a priority order setting step of setting a priority order defining an order among the associated regions, wherein the priority order is utilized to determine a size of each of the associated regions; and a display control step of displaying the regions and, when at least one of the associated regions has been selected by a user, displaying the priority order for the associated regions among which a region is currently selected, as well as the regions, wherein when a region is newly selected by a user from among the displayed regions, said display control step changes the displayed priority order from the currently displayed priority order to the priority order for the associated regions containing the region newly selected by the user.

9. A computer-readable storage medium storing a document processing program for performing a layout process using content data to be output and a single template in which a plurality of regions to which the content data is assigned are arranged, comprising:

a defining step of defining associated regions containing the regions connected with each other using a link specified by a user, wherein the associated regions are arranged in the single template;

a priority order setting step of setting a priority order defining an order among the associated regions, wherein the priority order is utilized to determine a size of each of the associated regions; and a display control step of displaying the regions and, when at least one of the associated regions has been selected by a user, displaying the priority order for the associated regions among which a region is currently selected, as well as the regions, wherein when a region is newly selected by a user from among the displayed regions, said display control step changes the displayed priority order from the currently displayed priority order to the priority order for the associated regions containing the region newly selected by the user.

* * * * *